(12) United States Patent
Benedict

(10) Patent No.: US 8,534,335 B2
(45) Date of Patent: Sep. 17, 2013

(54) DISTRIBUTED PUMP SELF-INFLATING TIRE ASSEMBLY

(75) Inventor: Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 424 days.

(21) Appl. No.: 12/890,738

(22) Filed: Sep. 27, 2010

(65) Prior Publication Data

US 2012/0073716 A1  Mar. 29, 2012

(51) Int. Cl.
*B60C 23/12* (2006.01)

(52) U.S. Cl.
USPC .......................................... 152/426; 152/419

(58) Field of Classification Search
CPC ....................................................... B60C 23/12
USPC .................. 152/415, 419, 423, 424, 425, 426
See application file for complete search history.

(56) References Cited

U.S. PATENT DOCUMENTS

| | | | | |
|---|---|---|---|---|
| 1,050,886 A | * | 1/1913 | Wetherell | 152/426 |
| 1,134,361 A | * | 4/1915 | Wetherell | 152/426 |
| 2,491,491 A | * | 12/1949 | Freygang | 152/208 |
| 3,304,981 A | | 2/1967 | Sheppard | 152/426 |
| 3,833,041 A | * | 9/1974 | Glad et al. | 152/509 |
| 4,922,984 A | * | 5/1990 | Dosjoub et al. | 152/415 |
| 5,052,456 A | * | 10/1991 | Dosjoub | 152/415 |
| 7,117,731 B2 | * | 10/2006 | Hrabal | 73/146 |
| 7,225,845 B2 | * | 6/2007 | Ellmann | 152/426 |
| 2004/0112495 A1 | | 6/2004 | Weise | 152/331.1 |
| 2006/0283534 A1 | | 12/2006 | Hawes | 152/415 |
| 2009/0044891 A1 | | 2/2009 | Lee | 152/416 |
| 2010/0243121 A1 | | 9/2010 | Eigenbrode | 152/419 |

FOREIGN PATENT DOCUMENTS

| | | |
|---|---|---|
| CN | 1111575 A | 11/1995 |
| DE | 3433318 A1 * | 3/1986 |
| WO | 2007/134556 A1 | 11/2007 |
| WO | WO 2010008338 A1 * | 1/2010 |

OTHER PUBLICATIONS

European Search Report completed Jan. 25, 2012.

* cited by examiner

*Primary Examiner* — Kip T Kotter
(74) *Attorney, Agent, or Firm* — Richard B. O'Planick

(57) ABSTRACT

A self-inflating tire assembly includes one or more air tube(s) connected to a tire and having a plurality of adjoining diaphragm chambers separated by a one-way valve. An air passageway extends through the air tube and the diaphragm chambers. The one-way valve allows a directional passage of air through the valve from an inlet valve side an outlet valve side. The footprint in a rotating tire sequentially collapses the diaphragm chambers to directionally pump air through the one-way valve between the diaphragm chambers and along the air passageway from an air tube inlet device to an air tube outlet device.

18 Claims, 31 Drawing Sheets

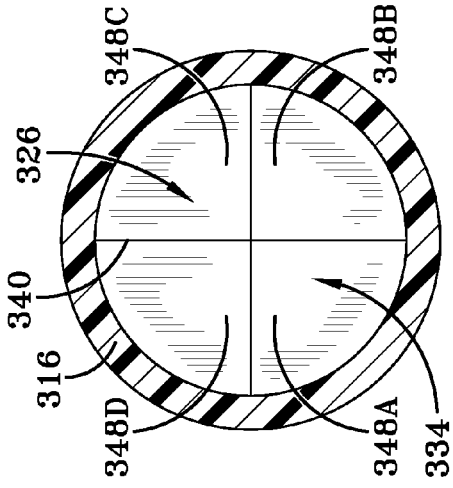
FIG-12A
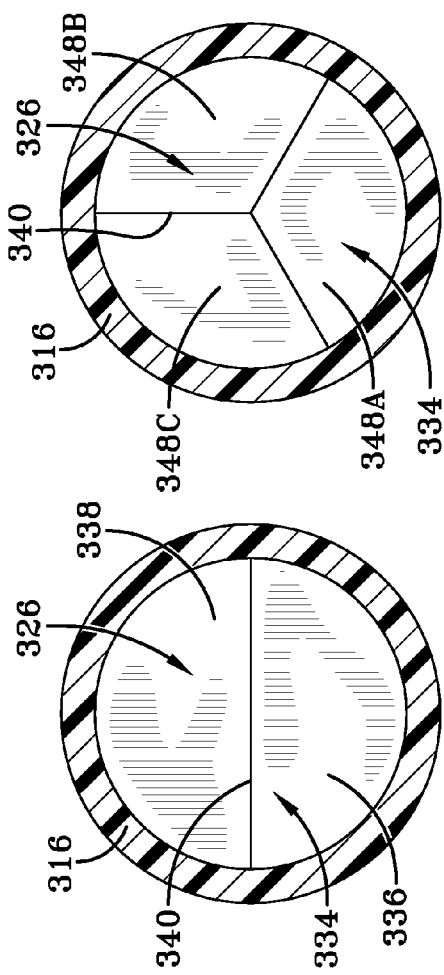
FIG-12B
FIG-12C
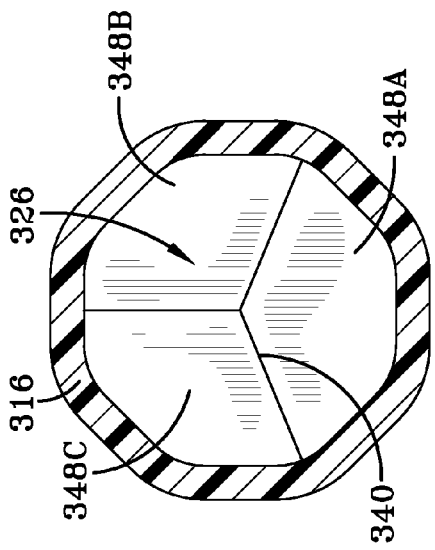
FIG-12D
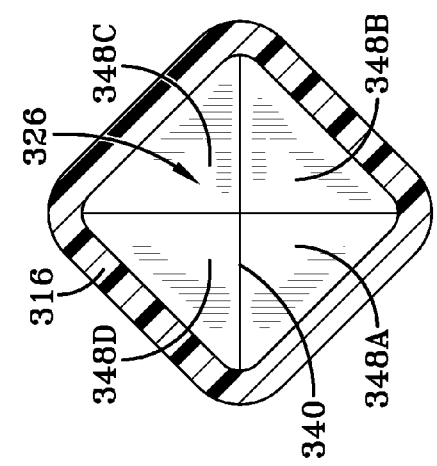
FIG-12E
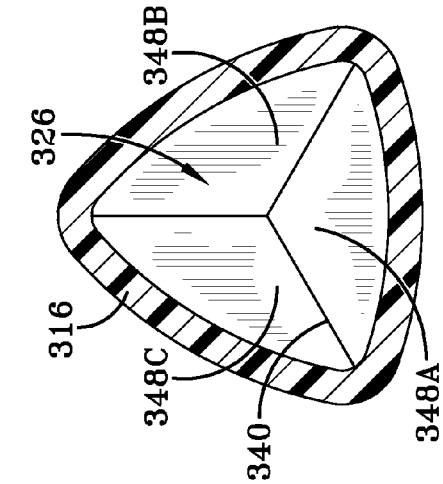
FIG-12F

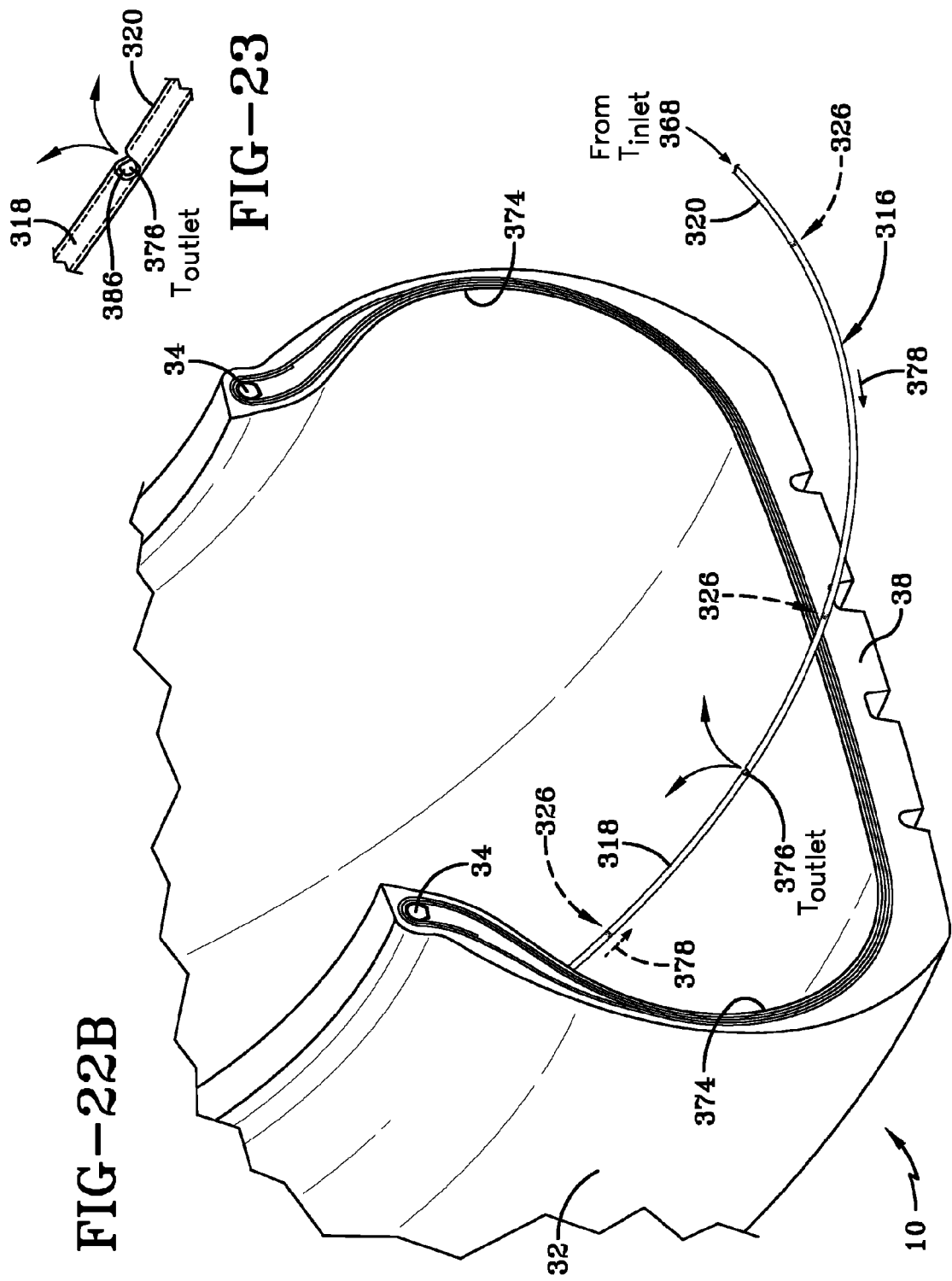

DISTRIBUTED PUMP SELF-INFLATING TIRE ASSEMBLY

FIELD OF THE INVENTION

The invention relates generally to self-inflating tires and, more specifically, to an air pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

In one aspect of the invention, a self-inflating tire assembly includes one or more air tube(s) connected to a tire and having a plurality of adjoining diaphragm segments containing compressible diaphragm chambers separated by a one-way check valve. An air passageway extends through the air tube and the diaphragm chambers. The one-way valve allows a directional passage of air through the valve from an inlet valve side an outlet valve side. The air tube being is composed of a flexible material operative to allow an air tube segment near a tire footprint to at least partially flatten, the tire footprint in a rotating tire being operative to sequentially compress the diaphragm chambers to pump air through the one-way valve between the diaphragm chambers and along the air passageway from an inlet device to an outlet device.

In another aspect, the adjacent diaphragm segments have respective volumes sized to compress one segment at a time in a rolling tire. The adjacent diaphragm segments in accordance with a further aspect have a respective segment length substantially equivalent to a segment length of the air tube flattened by a tire footprint deformation. The flattened tube segments resiliently return to an un-flattened condition when repositioned by tire rotation outside the tire tread footprint.

In a further aspect, the one-way valve is configured as a membrane body, the membrane body having one or more through-slit(s) closed to air flow through the membrane body toward the inlet device and open to air flow through the membrane body toward the outlet device. The membrane body substantially blocks the air passageway between the diaphragm chambers in a closed condition and at least partially deforms in an open condition to allow a flow of air through the through-slits only in the direction of the outlet device.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIGS. 12A through 12C are end views of the valve opening and two additional embodiments of opening configurations.

FIGS. 12D through 12F are sectional view of alternative air tube shapes.

FIG. 22B is an isometric view showing tube outlet location.

FIG. 23 is an enlarged view of outlet opening in tube.

DETAILED DESCRIPTION OF THE INVENTION

Figure 1:
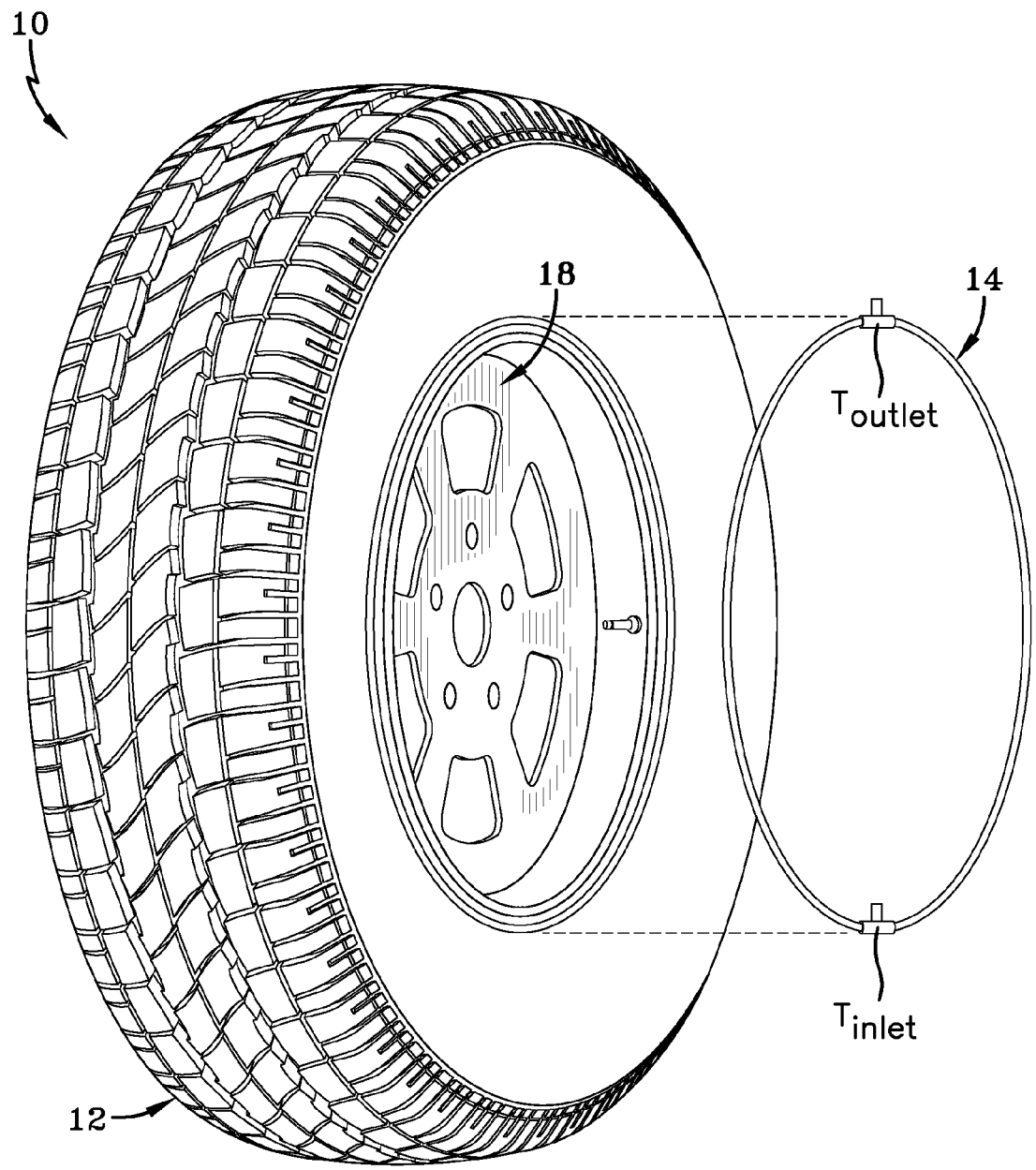
FIG. 1 is an isometric view of tire, rim and tubing with peristaltic pump and inlet valve.
Figure 5A:
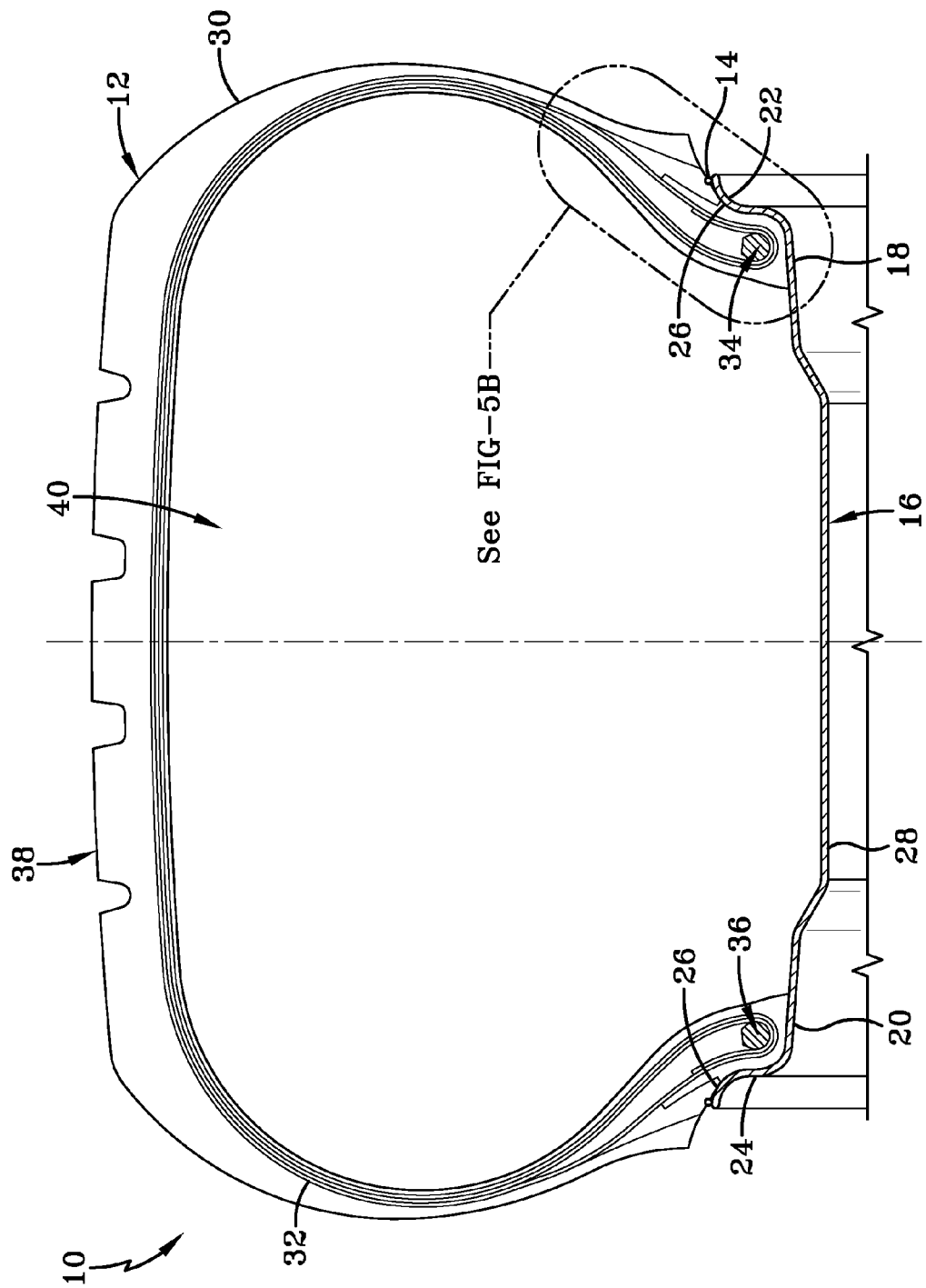
FIG. 5A is a partial section view through the tire at 180 degrees from road surface.
Figure 5B:
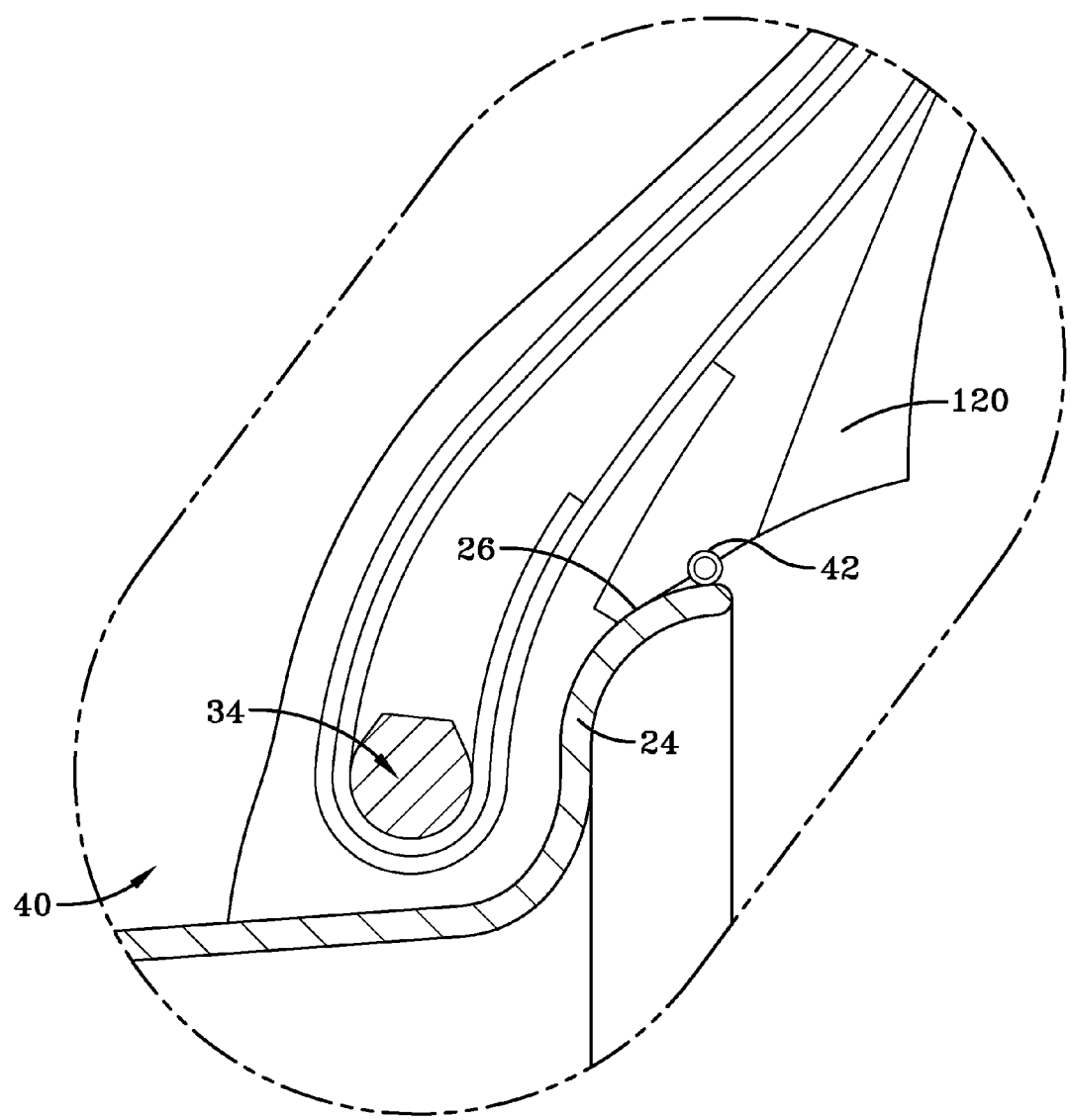
FIG. 5B is an enlarged view of tube location next to rim.

Referring to FIGS. 1 and 5B, a tire assembly 10 includes a tire 12, a peristaltic pump assembly 14, and a tire rim 16. The system shown represents the state of art for peristaltic systems of the type shown and described in co-pending U.S. patent application Ser. Nos. 12/643,176, and 12/643,243, which were both filed on Dec. 12, 2009, incorporated herein in their entirety by reference. The tire mounts in conventional fashion to a pair of rim mounting surfaces 18, 20 adjacent outer rim flanges 22, 24. The rim flanges 22, 24, have radially outward facing surface 26. A rim body 28 supports the tire assembly as shown. The tire is of conventional construction, having a pair of sidewalls 30, 32 extending from opposite bead areas 34, 36 to a crown or tire read region 38. The tire and rim enclose a tire cavity 40.

Figure 2:
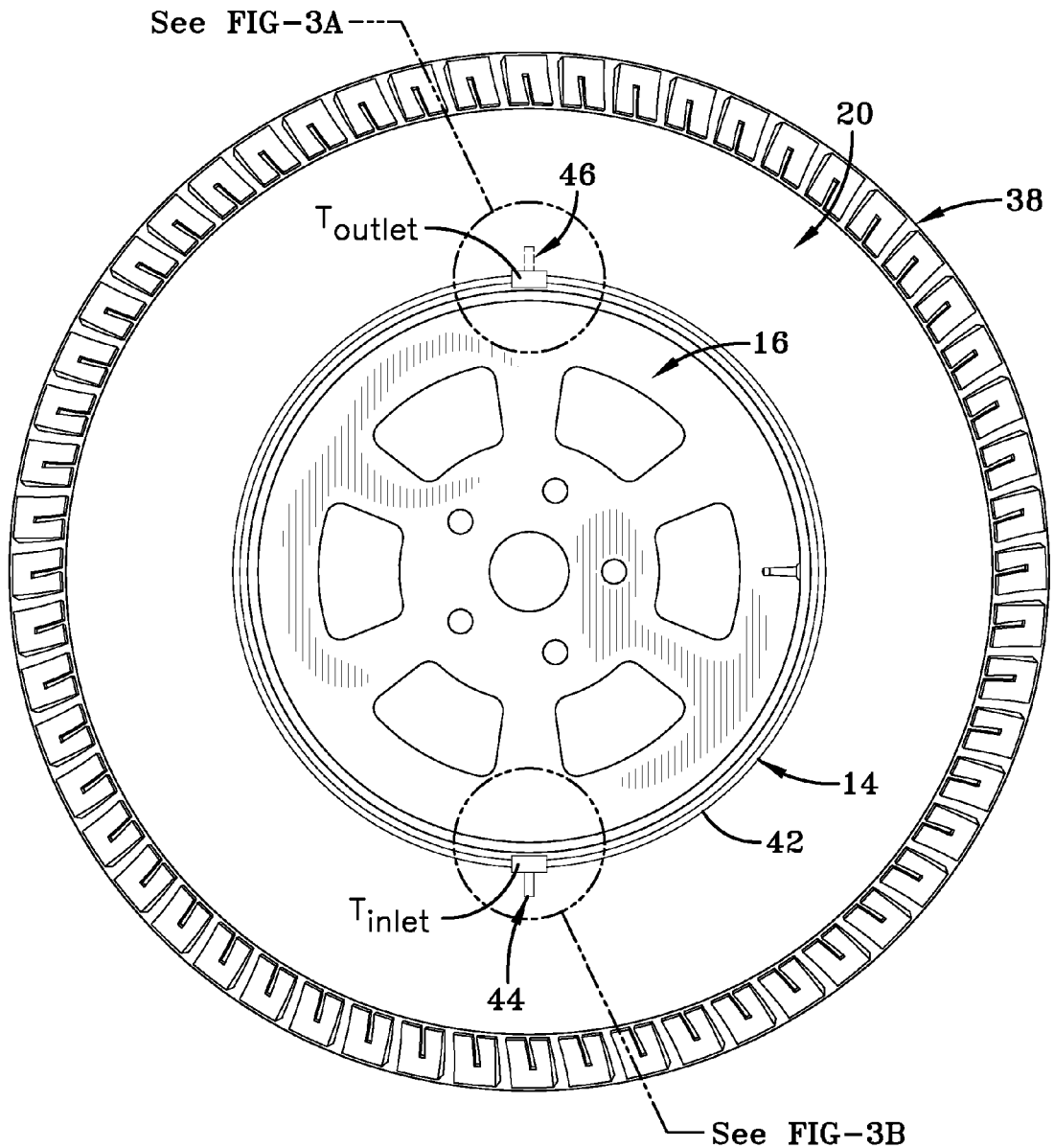
FIG. 2 is a side view of tire with location of tubing and valves and showing user set valve location.
Figure 3A:
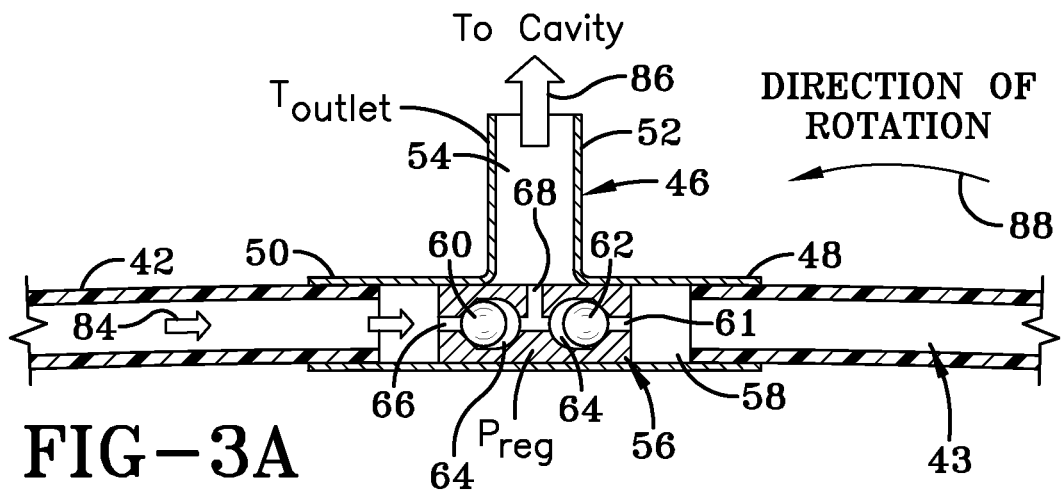
FIG. 3A is an enlarged fragmentary view of pump for outlet to tire cavity.

As seen from FIGS. 2 and 3A, B, and C, the peristaltic pump assembly 14 includes an annular air tube 42 that encloses an annular passageway 43. The tube 42 is formed of a resilient, flexible material such as plastic or rubber compounds that is capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described.

The peristaltic pump assembly 14 further includes an inlet device 44 and an outlet device 46 spaced apart approximately 180 degrees at respective locations within the air tube 32. The outlet device 46 has a T-shaped configuration in which T-sleeves 48, 50 join at one end to an outlet sleeve 52. An internal outlet passageway 54 extends through the outlet sleeve 52 and is in air flow communication with the tire cavity 40. Situated within an axial chamber of each of the T-sleeves 48, 50 is a valve unit 56 positioned opposite and in air-flow communication with the outlet passageway 54 of the outlet sleeve 42. The valve unit 56 is of a conventional type commercially available, and includes a pair of one-way ball valves 60, 62, each seated within a respective ball valve chamber 64. The ball valves 60, 62 are spring biased (not shown) in conventional manner into a normally closed configuration closing off the outlet passageway 54. When air from the passageway 43 impinges on the ball valves 60, 62 with a sufficient pressure to overcome the tire cavity biasing pressure, the ball valves move rearward and the T-outlet is open to the passage of air from passageway 43 out of the outlet passageway 54. The magnitude of bias necessary for the air from passageway 43 to overcome can be set so as to regulate the flow of air out of the outlet device 46 by also incorporating a biasing spring (not shown) against each ball valve 60, 62, biasing with the tire cavity pressure the ball valves into a closed position. The air from tube passageway 43 must be of sufficient pressure to overcome the tire cavity pressure and biasing spring pressure for the ball valves to move into an open position, whereby starting a flow of air into the tire cavity 40.

The inlet device 44 is similarly of T-shaped configuration having a pair of co-axial inlet sleeves 70, 72 co-aligned with an inlet portal sleeve 74. An air passageway 76 extends through the inlet portal sleeve 74 and permits the flow of air therethrough into and out of the air passageway of the tube 42. A filter 80 may be positioned within the inlet portal sleeve 74. Filter 80 is composed of a porous filtering agent of a type conventionally available. So positioned within the sleeve 74, the filter 80 purifies air entering the tube passageway 43, identified in FIG. 3B as "outside air". A back flow of air out of passageway 43, through the filter 80 within sleeve 74, operates to self-clean the filter by forcing our particles trapped within the porous filtering medium. An insert T-body 82 resides within the inlet device 44 and serves to line the sleeves 70, 72.

As will be appreciated from FIGS. 3A through 3C and 4A, the inlet device 44 and the outlet device 46 are positioned within the circular air tube 42 generally 180 degrees apart. The tire rotates in a direction of rotate 88, causing a footprint 100 to be formed against the ground surface 98. A compressive force 104 is directed into the tire from the footprint 100 and acts to flatten a segment 110 of the air tube passageway 43 as shown at numeral 106. Flattening of the segment 110 of the passageway 43 forces air from the segment along tube passageway 43 in the direction shown by arrow 84, toward the outlet device 46.

As the tire continues to rotate in direction 88 along the ground surface 98, the tube 42 will be sequentially flattened or squeezed opposite the tire footprint segment by segment in a direction opposite to the direction of tire rotation 88. The sequential flattening of the tube passageway 43 segment by segment causes evacuated air from the flattened segments to be pumped in the direction 84 within tube passageway 43 to the outlet device 46. When the air flow is sufficient against ball valve 60, the valve will open and allow air to flow through the outlet device 46 to the tire cavity as shown at 86. As referenced by arrow 86, air exiting the outlet device sleeve 52 is routed to the tire cavity 40 and serves to re-inflate the tire to a desired pressure level. The tire cavity pressure acts against the ball valves 60, 62 in combination with any ancillary biasing spring (not shown) which must be overcome by the air pressure within the tube passageway 43 in order for the ball valve to open.

Figure 3B:
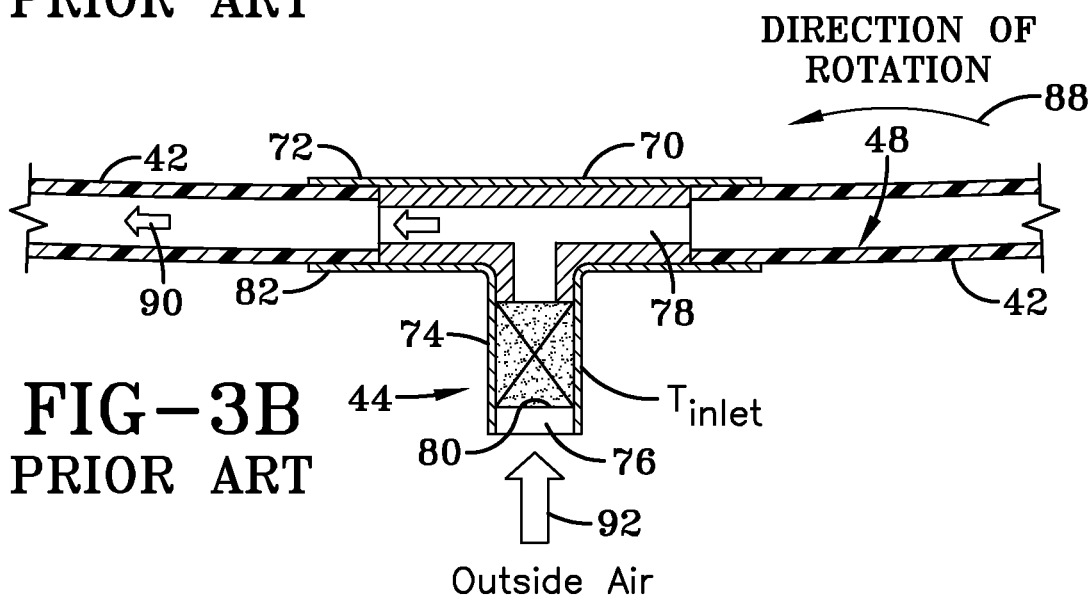
FIG. 3B is enlarged fragmentary view of inlet and filter.
Figure 3C:
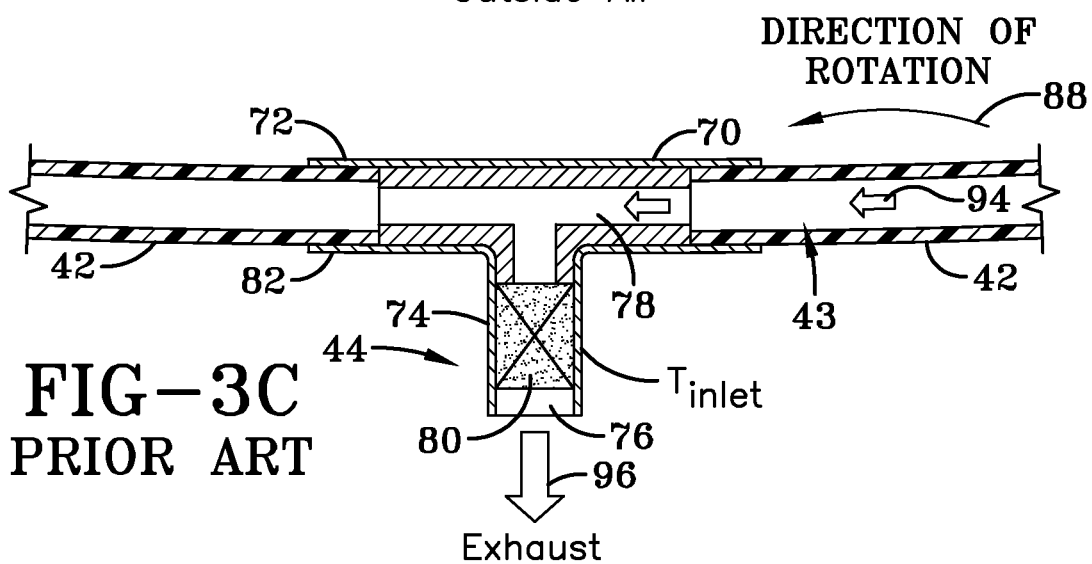
FIG. 3C is an enlarged fragmentary view of inlet and filter in the exhaust mode.
Figure 4A:
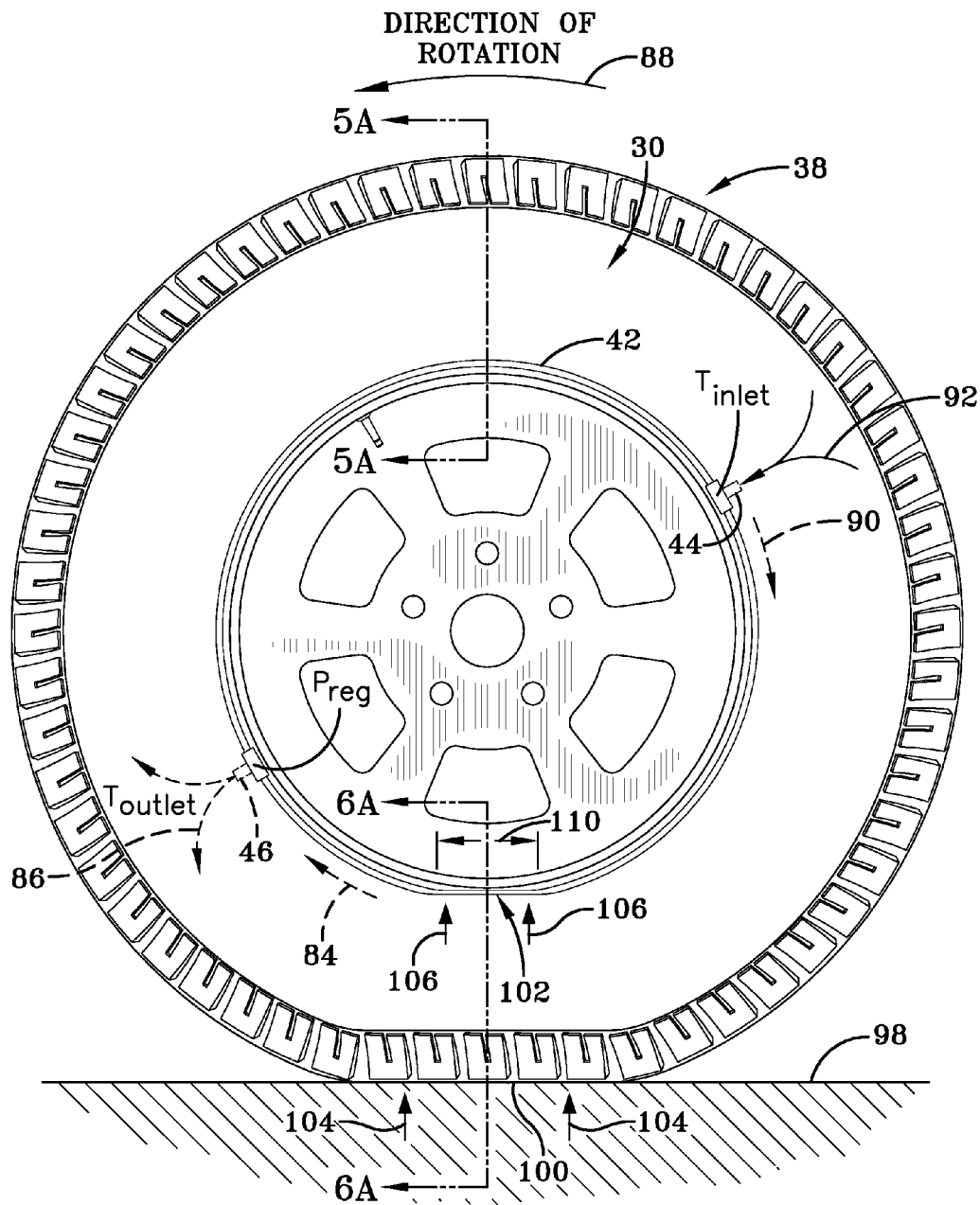
FIG. 4A is a side view of tire, rim, tubing, and valves showing operation of the pump to cavity flow when the tire rotates.
Figure 4B:
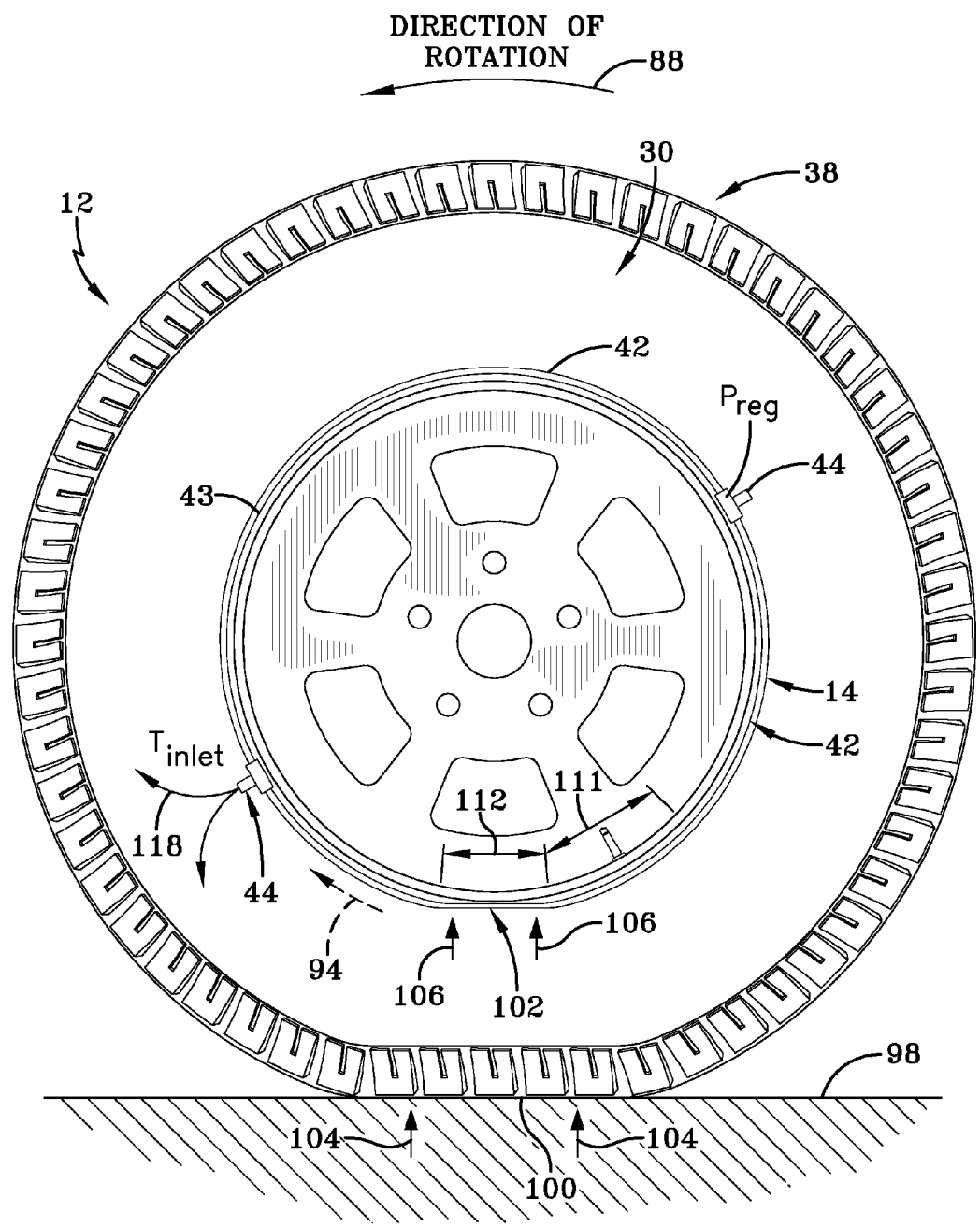
FIG. 4B is a side view of the tire, rim, tubing, and valves showing operation of flow back out of the filter (cleaning) when the tire rotates.

With the tire rotating in direction 88, flattened tube segments are sequentially refilled by air 92 flowing into the inlet device 44 along the passageway 43 in the direction 90 as shown by FIGS. 3B and 4A. The inflow of air from the inlet device 44 in direction 90 continues until the outlet device 46, rotating counterclockwise as shown with the tire rotation 88, passes the tire footprint.100. FIG. 3C and FIG. 4B show the orientation of the peristaltic pump assembly 14 in such a position. In the position shown, the tube 42 continues to be sequentially flattened segment by segment opposite the tire footprint by compressive force 104 as shown at numeral 106. Air is pumped in the clockwise direction 94 to the inlet device 44 where it is evacuated or exhausted from the passageway 43. Passage of exhaust air 96 from the inlet device 44 is through the filter 80 which acts to self-clean the filter of accumulated debris or particles within the porous medium. With the evacuation of pumped air out of the inlet device 44, the outlet device is in the closed position and air does not flow therefrom to the tire cavity. When the tire rotates further in counterclockwise direction 88 until the inlet device 44 passes the tire footprint 100 (as shown in FIGS. 3A, 3B, and 4A), the airflow resumes to the outlet device 46, opening the ball valve within the outlet device 46, and causing the pumped air to flow out (86) to the tire cavity 40.

FIG. 4B illustrates that the tube 42 is flattened 102 segment by segment as the tire rotates in direction 88. A flattened segment 111 moves counterclockwise in direction 88 with the tire as an adjacent segment 112 moves opposite the tire footprint. Accordingly, the progression of squeezed or flattened tube segments can be seen to move in a clockwise direction, counter to the tire rotation in direction 88. As segment 111 moves away from the footprint 100, the compression forces within the tire from the footprint region are eliminated and the segment 111 is free to resiliently reconfigure into an unflattened state as segment 111 refills with air from passageway 43. In the original unflattened configuration segments of the tube 42 are generally circular in section.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 88 of the tire 12 is shown in FIGS. 4A and 4B to be counterclockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Figure 6A:
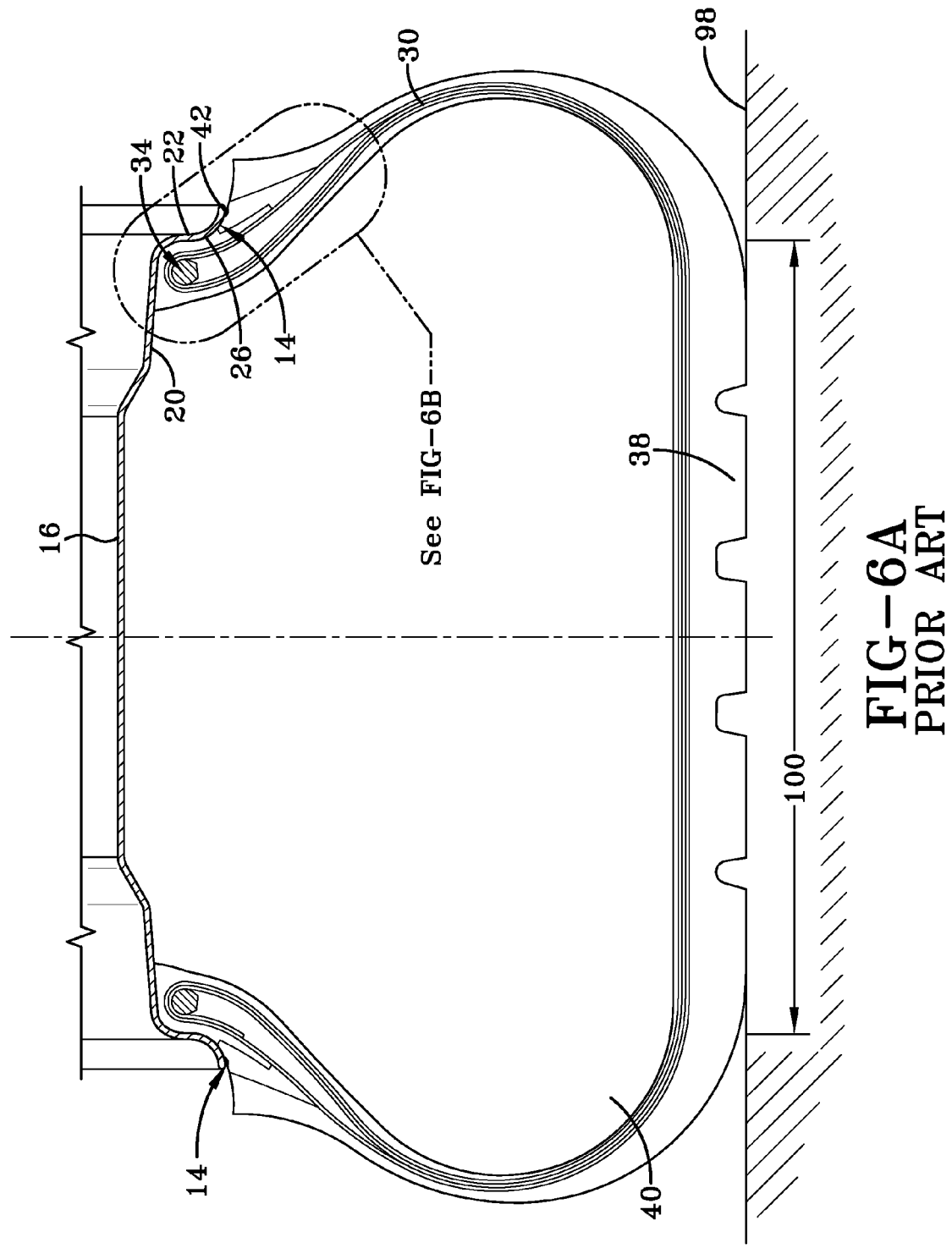
FIG. 6A is a partial section view through the tire at road surface.
Figure 6B:
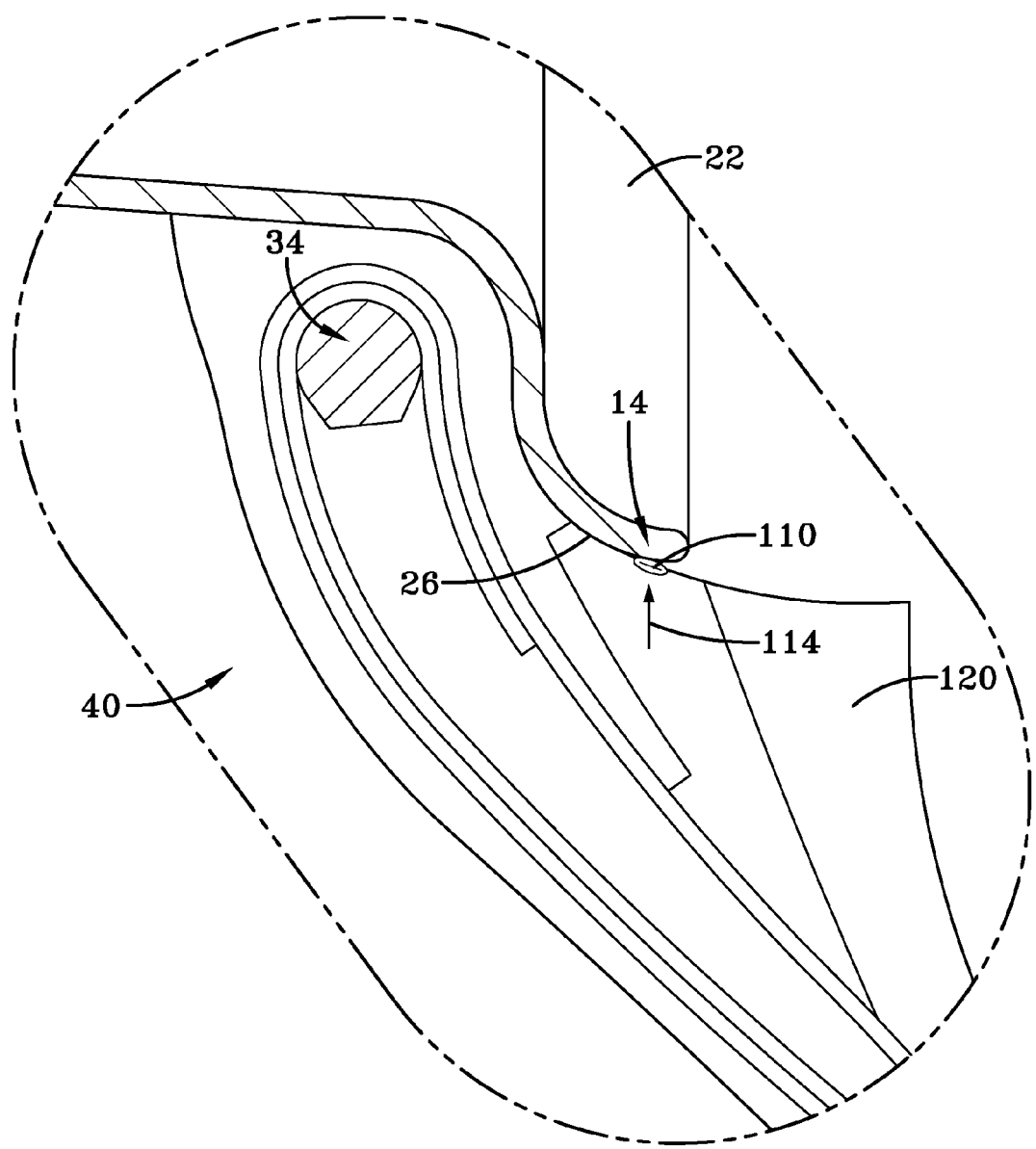
FIG. 6B is an enlarged view of the tube compressed against the rim.

The location of the peristaltic pump assembly will be understood from FIGS. 6A and 6B. In one embodiment, the peristaltic pump assembly 14 is positioned between the rim flange surface 26 and a lower bead region 34 of the tire 12. So positioned, the air tube 42 is radially inward from the tire footprint 100 and is thus positioned to be flattened by forces directed from the tire footprint as described above. The segment 110 that is opposite the footprint 100 will flatten from the compressive force 114 from the footprint 100 pressing the tube segment against the rim flange surface 26. The positioning of the tube 42 is specifically shown as between a chafer 120 of the tire at the bead region 34 and the rim surface 26. The diametric sizing of the peristaltic pump air tube 42 is selected to span the circumference of the rim flange surface 26.

The regulation of pressure may be effected in one approach by the condition that if P (at the chamber 68)<Pset, the valve opens to the cavity and air is admitted from the tube 42. If P>Pset, the ball valves remain closed and air vents to the outside via the inlet device 44. A second option is to set the pressure Pset such that if P<Pset, the valve opens to the cavity and if P>Pset, the one way ball valves 60, 62 within the outlet device 46 are bypassed and air re-circulates in the tube passageway 43.

From the forgoing, it will be appreciated that the subject invention provides a bi-directionally peristaltic pump for a self-inflating tire in which a circular air tube 42 flattens segment by segment and closes in the tire footprint 100. The air inlet T-device 44 may include a filter 80 and be self-cleaning. The outlet T-device 46 employs a valve unit that may be configured as two one-way valves such as, but not limited to, the ball valves 60, 62. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Figure 10:
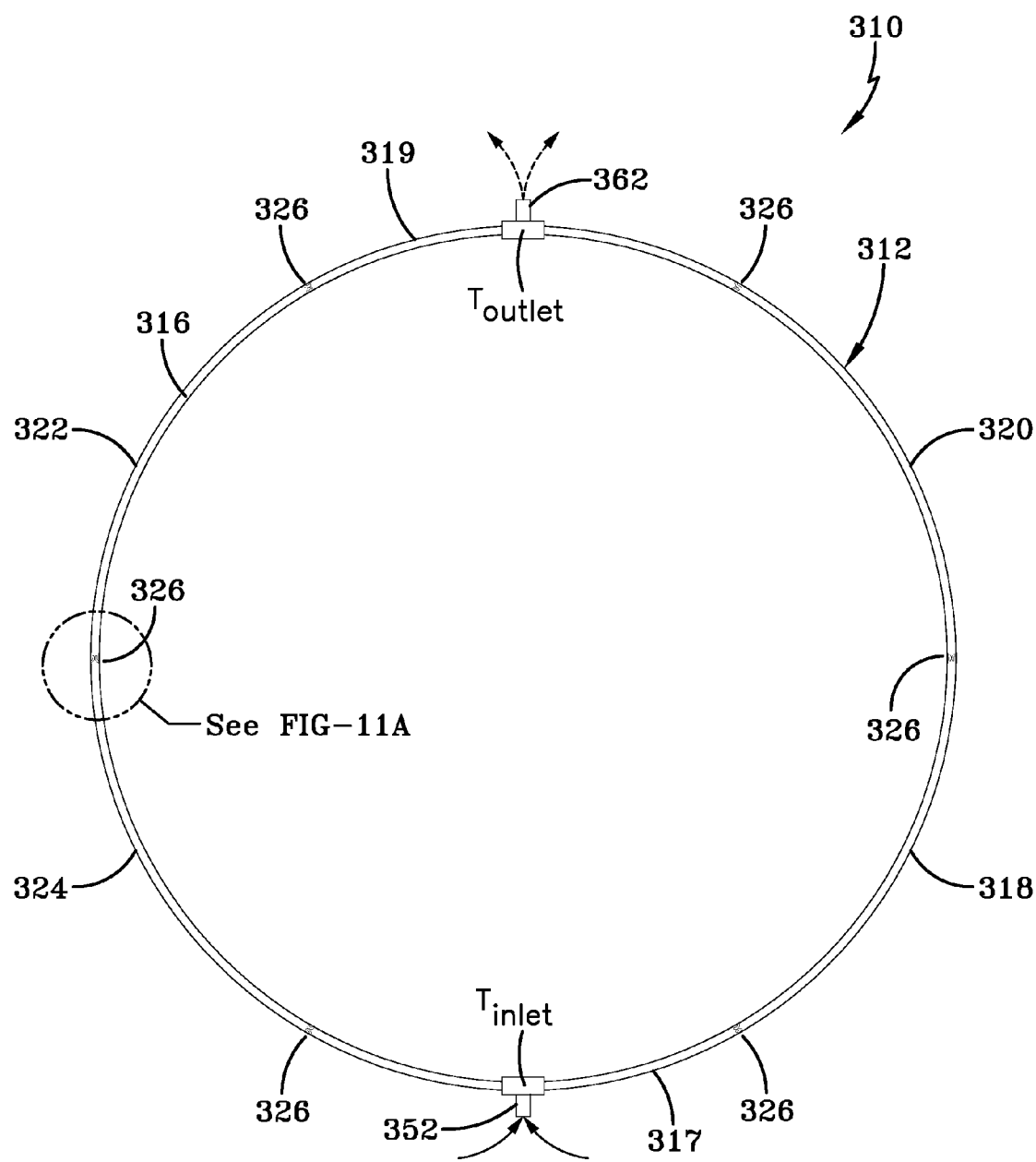
FIG. 10 is an annular air tube side elevation view showing vein valve locations.

While a peristaltic system of the type shown in FIGS. 1 through 6B works well, a peristaltic pump depends on crushing a tube 42 completely closed for operation. Such an action may be relatively difficult to accomplish but, if successful, will generate air flow at high pressures. Alternatively, as depicted by FIGS. 7A through 20, a diaphragm pump system 310, with specific reference to FIG. 10, works by changing the volume of a cavity or air passageway 312 in a deformable body 316. The diaphragm system is relatively easier to effect in operation but may prove harder to reach desired high pressure air flow levels. In order to overcome the pressure change limitations of a diaphragm approach, as shown several diaphragm segments 318, 320, 322, and 324 within an air tube 316 may be chained together with one way valves 326 between them. While four diaphragm segments 318, 320, 322, and 324 are shown in the annular configuration of FIG. 10, more or fewer diaphragm segments may be deployed to attain the desired volume and pressure of pumped air through the passageway 312 of tube 316.

FIGS. 7A, 7B, 8, 9 and 10 show a circumferential layout for a diaphragm system 310 in which the pumping tube 316 is deformed by either crushing against the tire rim at or by closing of a slot in compression due to tire bending. Locations 200, 202, 204 represent potential locations for placement of the system 310. The diaphragm (also referred to herein as "bladder") tube body 316 is attached to the tire that is deformed by tire bending. This tube may be configured radially or circumferentially and attached to the inside of the tire at a location that undergoes large changes of radius (bending) as that location rolls through the footprint. For example, without limiting the invention to other locations, locations that undergo large radius or bending may include:

(A) A radial tube on the inner liner,
(B) A circumferential tube at the point of maximum sidewall footprint bulge,
(C) A radial tube on the inner liner at the shoulder, and
(D) A circumferential tube at the crown centerline.

Figure 7A:
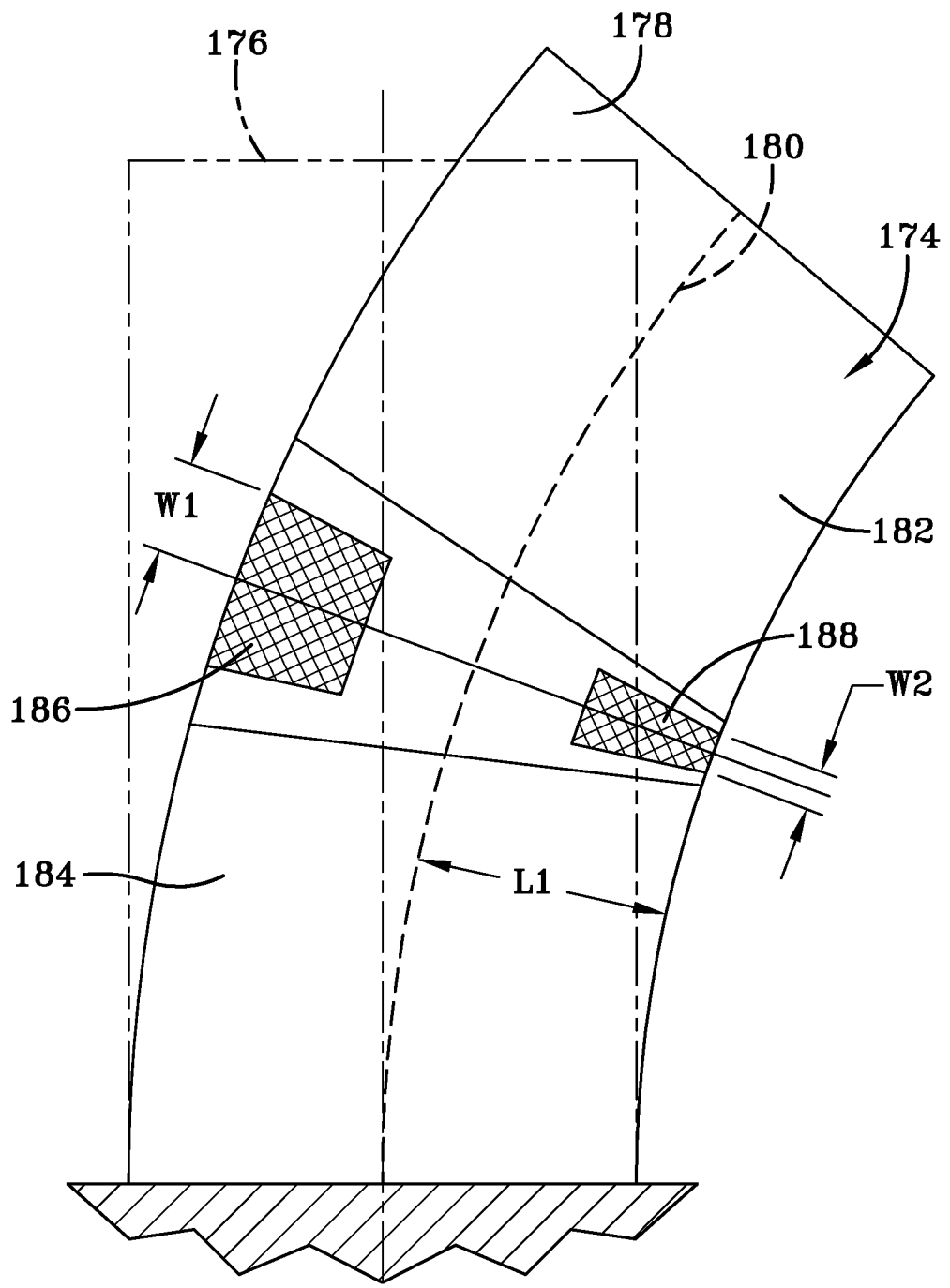
FIGS. 7A and 7B are schematic layout views of tire movement and regions of sidewall tube locations.
Figure 7B:
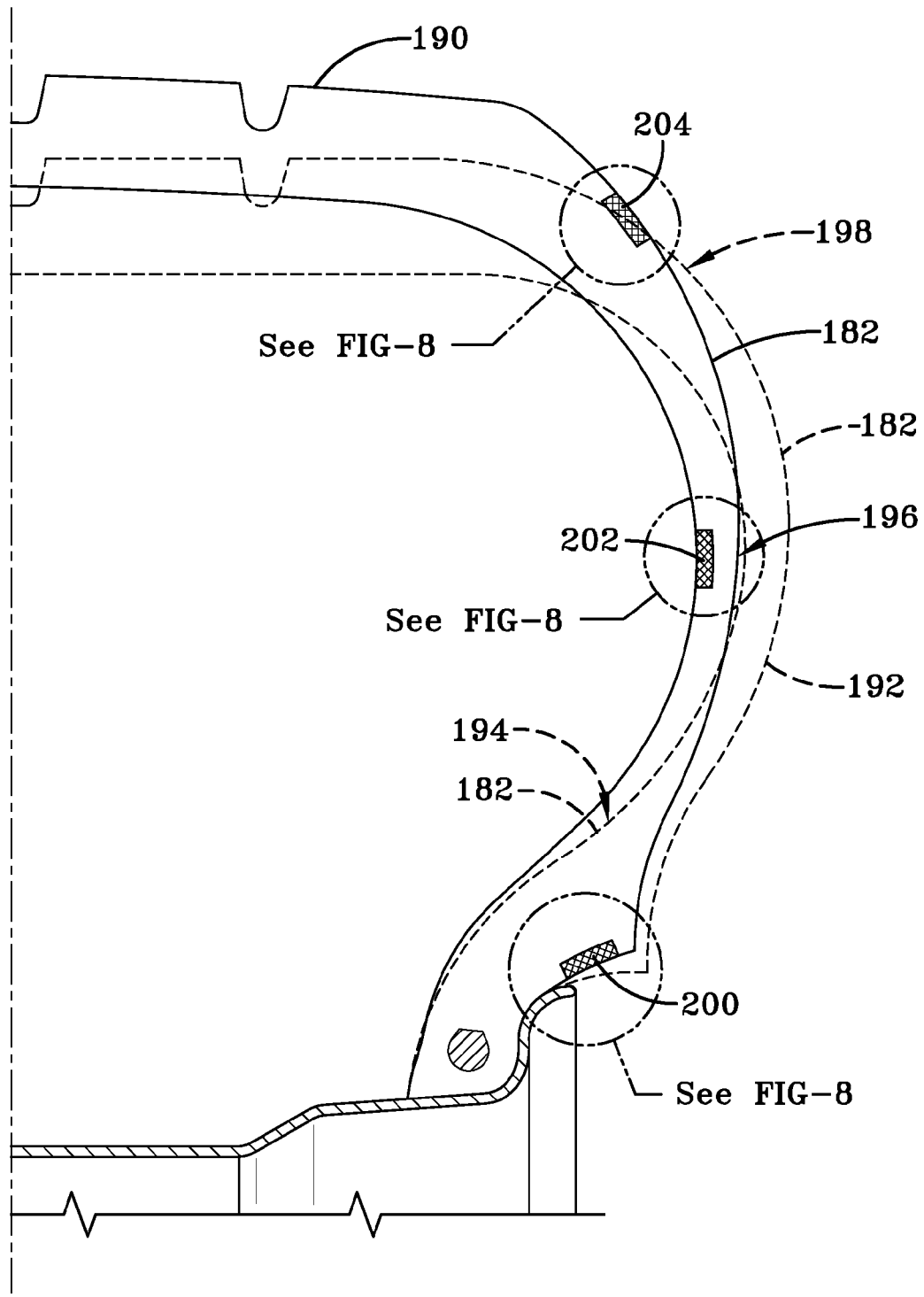
Figure 8:
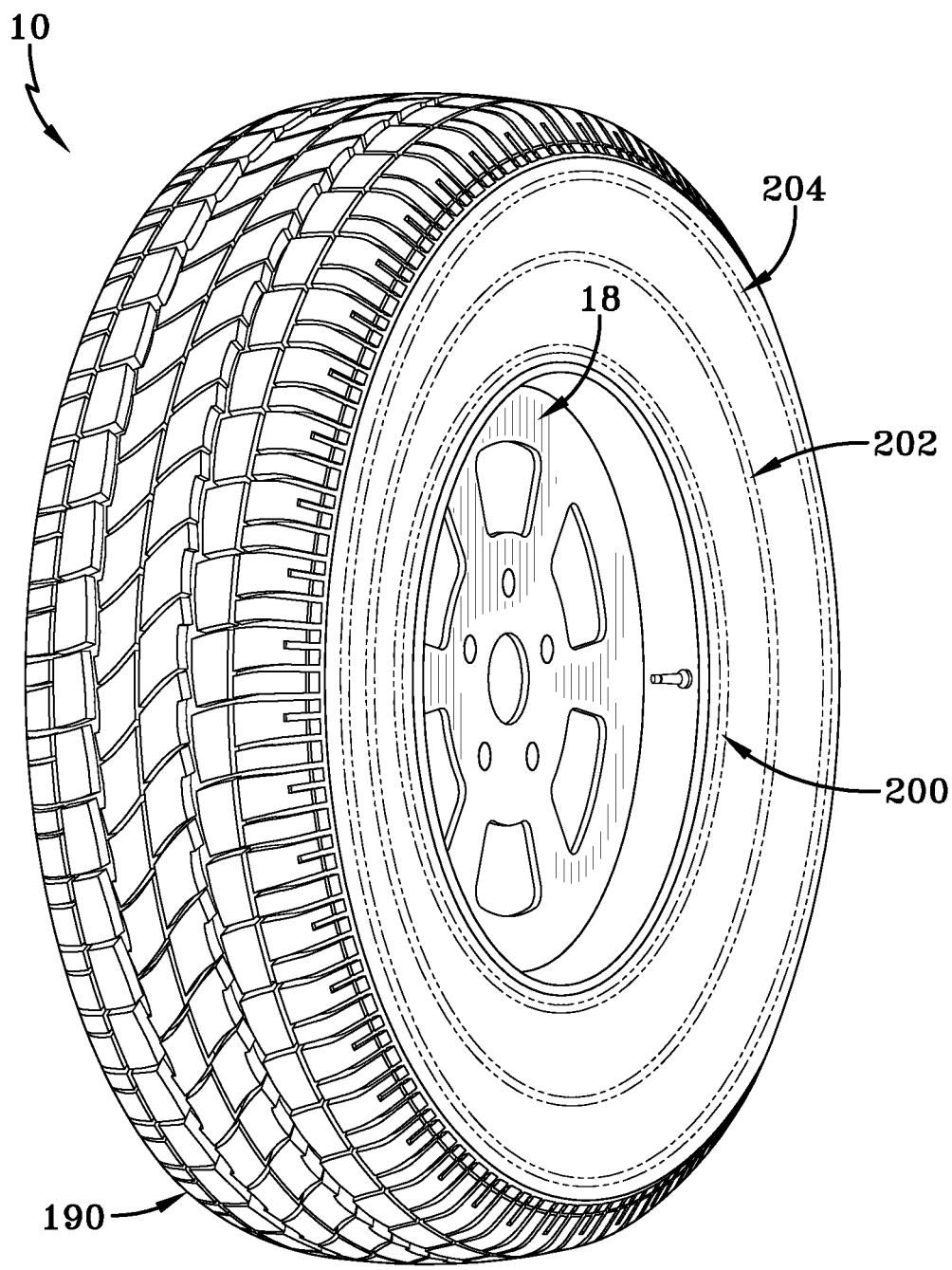
FIG. 8 is an isometric view of tire showing sidewall tube locations.
Figure 9:
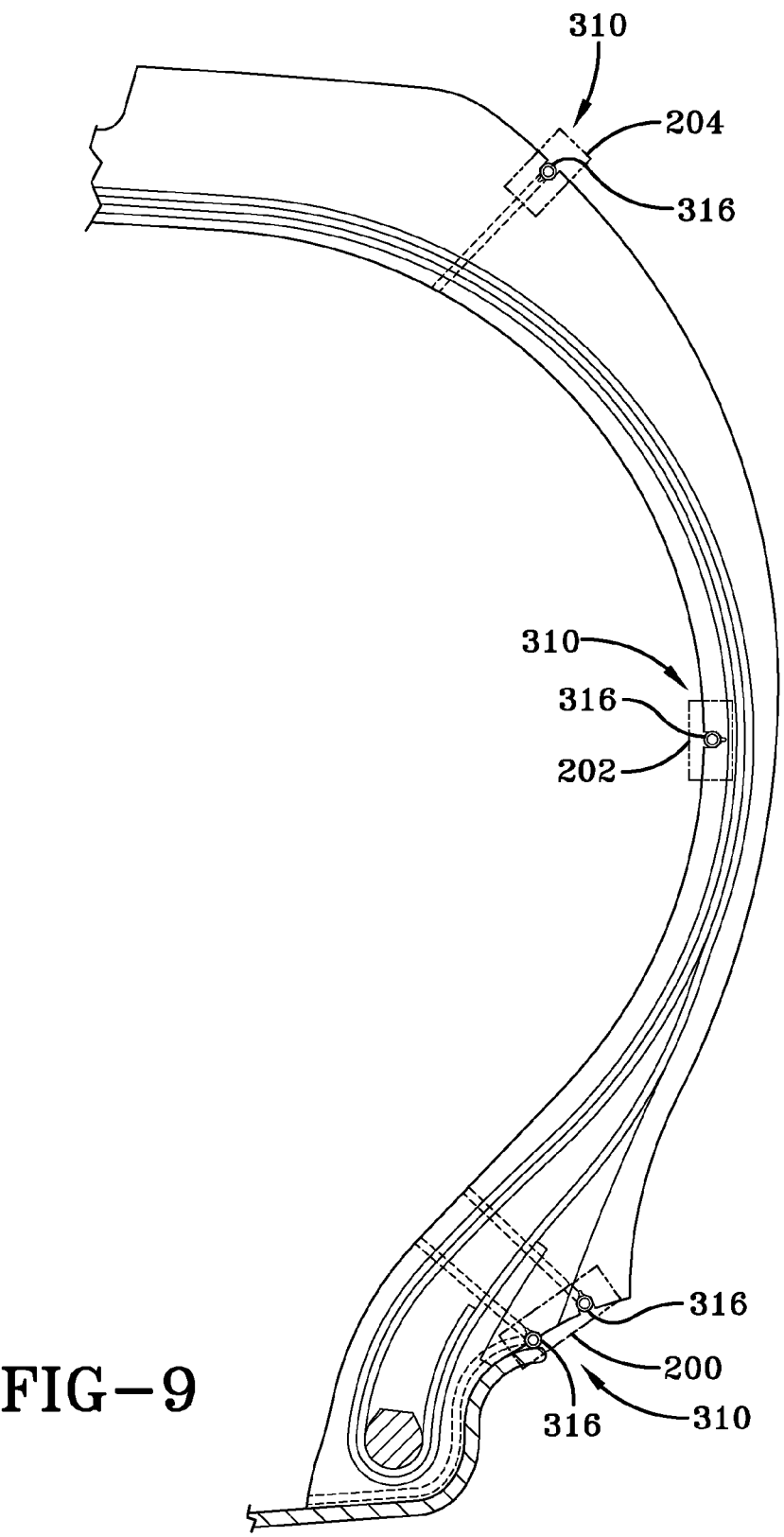
FIG. 9 is a sectioned view of tire tube locations.

FIGS. 7A and 7B illustrate in schematic representation the placement of the groove and air tube within a tire. As will be appreciated, the sidewalls of a rolling tire generally bend and undergo a geometric transformation from bending strain introduced into the sidewalls as the tire rolls against a ground surface. The bending strain within sidewall regions adjacent to a tire footprint causes the radius of curvature within certain such sidewall regions of the sidewalls to bend to a greater extent. In a bending region 174 of a sidewall, the region transforms from the unstrained configuration shown at 176 into the bending configuration shown at 178. In the bending condition, the region 174 will have a neutral axis 180 that is not under strain; a compression side 182 of the neutral axis 180 of the region 174 that is under compression, and an elongation side 184 of the neutral axis 180 of the region 174 that under elongation. For placement of the groove and air tube, a bending region of the sidewall is selected that will experience bending strain when that region is adjacent to the tire footprint. The compression side 182 of the region 174 is satisfactory for placement of the tube body 316 within a groove since a compression of the side 182 of the region 174 will cause the groove to close around the air tube. To the contrary, the elongation side 184 of the region 174 is unsatisfactory for such a side under elongation strain, will cause the groove to widen rather than close, and not result in a flattening of the tube. Placement of the groove and tube assembly should further be placed within the compression side 182 of the region 178 at a location farthest removed from the neutral axis 180, for such a location will experience the greatest compression strain. Location of the groove and tube farthest from the neutral axis 180 of the selected bending region 174 will accordingly expose the groove to maximum closing due to a maximum compression force and bending imposed upon the tire region surrounding the groove. As a result, efficient and complete closing and collapse of the groove will result, causing an equally efficient and complete flattening of the air tube within the groove.

It will be appreciated that the bladder or diaphragm system 310 may be incorporated in a radial or annular form into a number of different sidewall regions, such as 200, 202, 204 to subject the tube body 316 to a bending force required to deform the tube body 316 segment by segment as the tire rotates. Utilizing the bending strain within a bending region of a sidewall avoids the need to compress the air tube by pinching the air tube against a relatively hard barrier such as the tire assembly rim. Potential damage to the air tube from contact with the rim is thus avoided and the structural integrity of the air tube is preserved throughout the life cycle of the tire.

Figure 13:
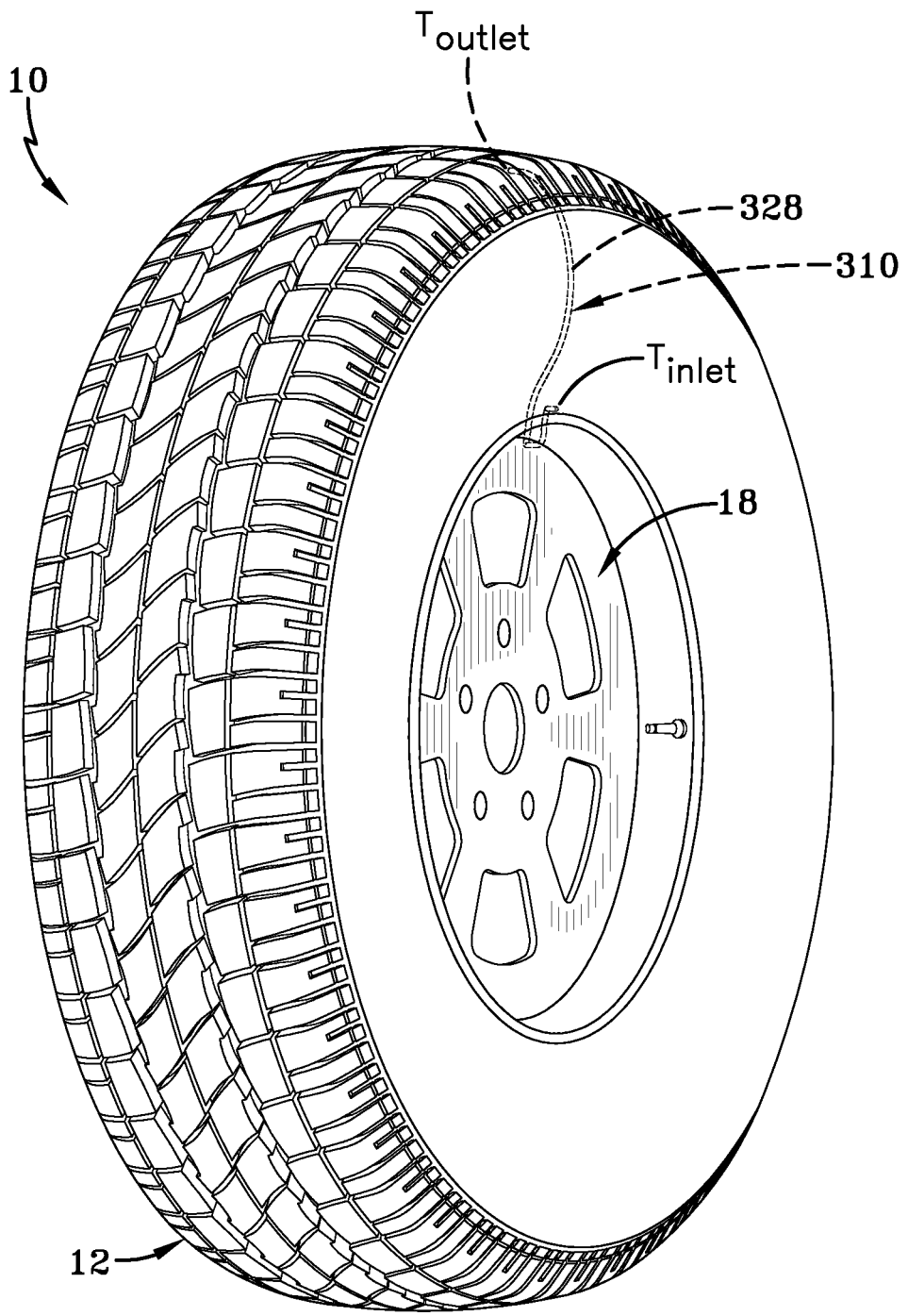
FIG. 13 is an isometric view of the tire showing the radial spoke location.
Figure 14A:
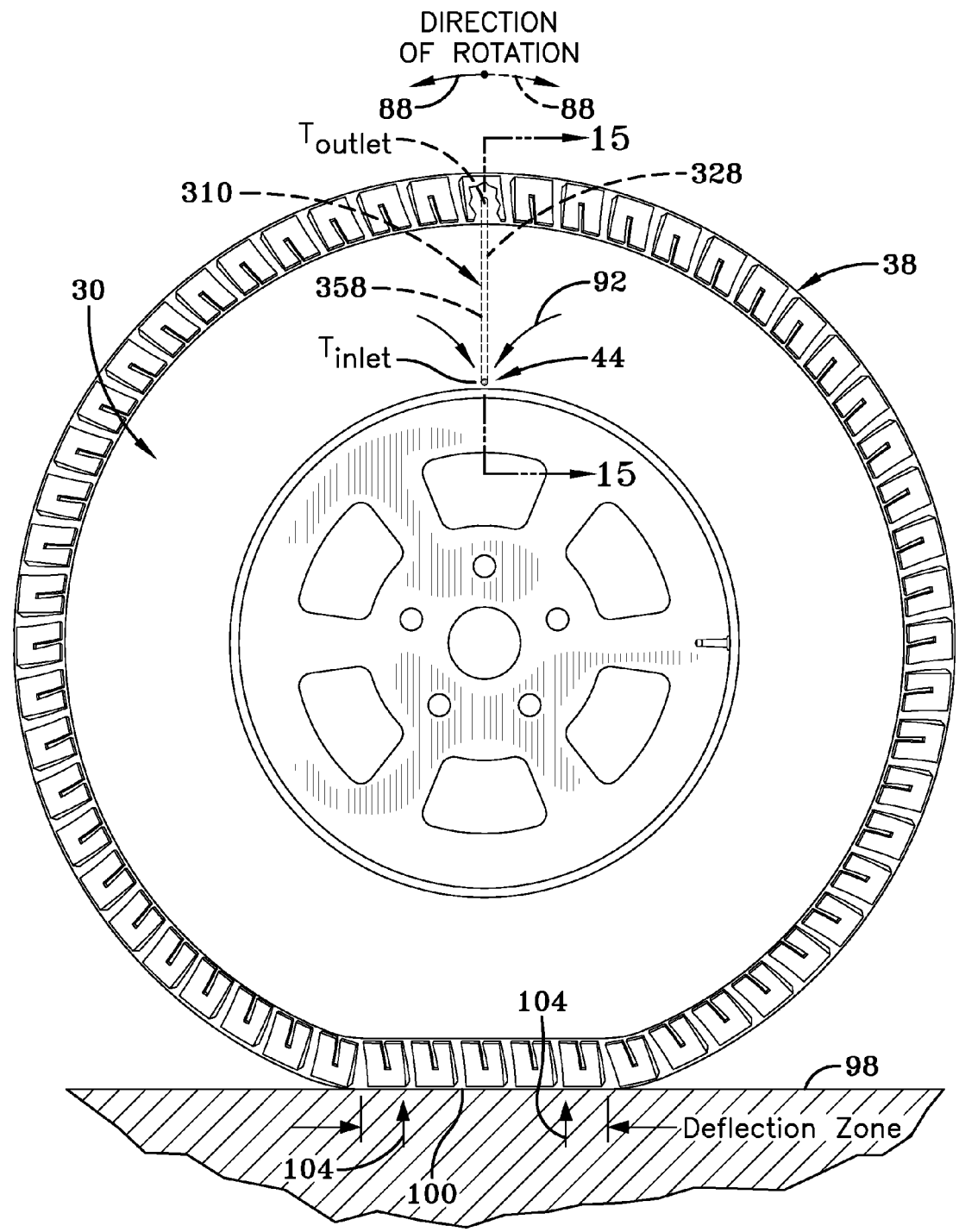
FIG. 14A is a side view of FIG. 13 showing the spoke in the uncompressed state for section view along the line 15-15.

A used herein, "tube" means an air passageway body having a plurality of segments 318, 320, 322, and 324, with adjacent segments connected together through a one-way check valve 326. The segments 318 through 324 forming the tube body 316 need not necessarily be round in cross-section along the segment length as will be noted from the embodiments shown in FIGS. 25A through D and described below. The air tube body 316 may be circular or annular as show in FIG. 10 or radial 328 such as shown at FIGS. 13 and 14A. The diaphragm or bladder system 316, as with the peristaltic prior system 10 shown in FIGS. 1 through 6B, pumps air along the air passageway 312 regardless of the order or sequence in which the segments 318 through 324 are flattened. The system is thus bidirectional and can be configured to pump air into a tire in either direction of rotation. The circumferential layout 316 (FIG. 10) is a configuration in which the pumping tube is deformed by either crushing against the tire rim or by closing of a slot in compression due to tire bending.

The diaphragm pump system 310 in either the circular tube form 316 or the radial configuration 318 relies on compression of each segment 318 through 326 into a partially flattened condition to pump air from a partially flattened segment along the air passageway 312. Each section or segment 318 through 324 of the tube 316, 328 between check valves 326 works optimally if the sections are sized large enough in length to have only one section compressed at a time. In the optimum length, the segments compress segment by segment so they do not oppose each other's pressure increase) but small enough to have good volume reduction (for good pressure increase). Thus, in an optimum dimensioning of the segments 318 through 324, a section length is used that approximates the length of the tube flattened by the footprint deformation of a rolling tire.

Figure 11A:
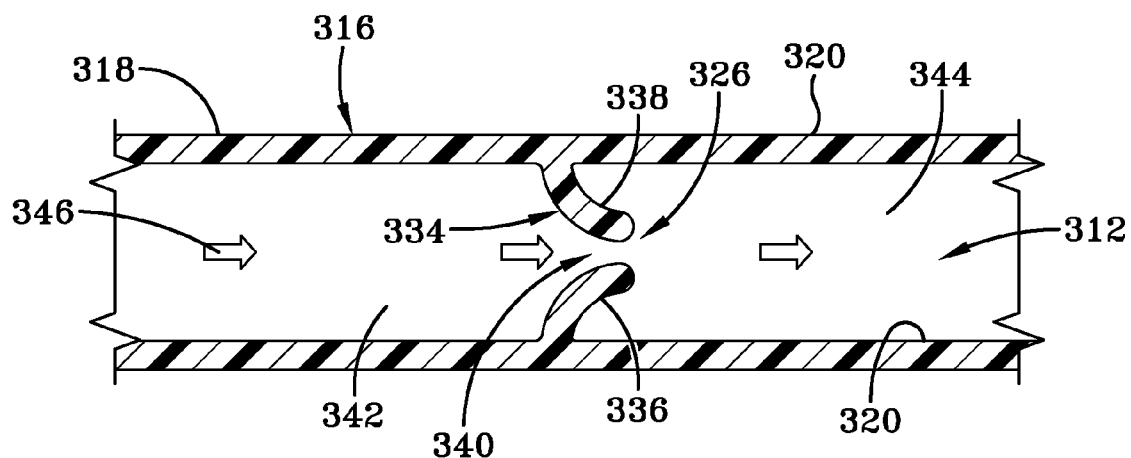
FIGS. 11A and 11B are section views showing vein open and closed positions.
Figure 11B:
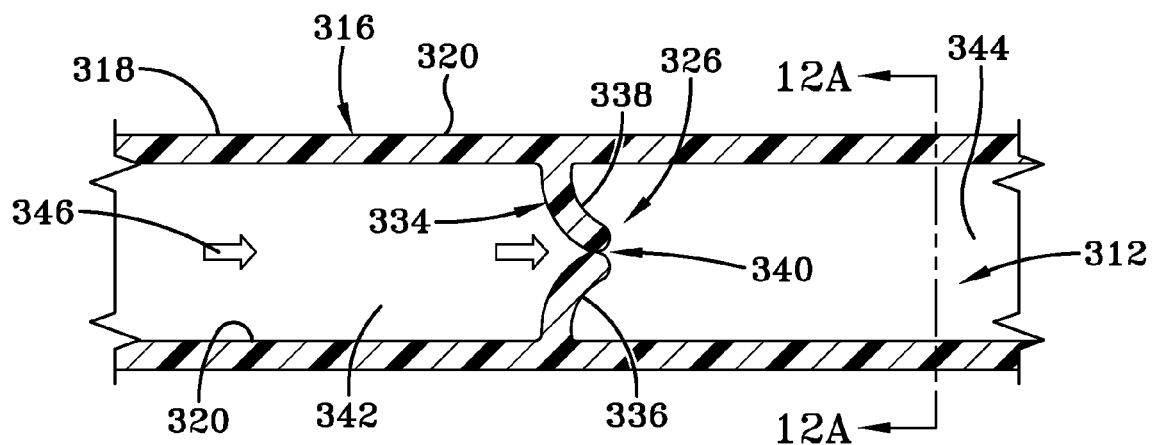

With reference to FIGS. 11A, 11B, and 12A, one way check valves 326 are placed between adjacent diaphragm segments 318 through 324 and are generally of a type commercially available within the industry. Each check valve 326, in the representative configuration shown, includes a membrane 334 divided into two or more membrane sections 326, 328 separated by one or more slit(s) 340. The membrane sections 326 are directionally biased to open in a direction allowing air to flow within the air passageway 312 between diaphragm chambers 342, 344 in the direction shown by arrows 346. FIG. 11A depicts the valve 326 in the open condition allowing the flow of pressurized air in direction 346 when the pressure of the forced air reaches a sufficiently high pressure to force membrane sections 326, 328 apart. When the air pressure falls below the requisite level necessary to open the valve 326, membrane sections 326, 328 close about slit 340, blocking air flow in direction 346 as well as blocking back flow of air in passageway 312. FIG. 11B shows the valve 326 in the closed position.

Other types of commonly used valve configurations may be employed if desired without departing from the scope of the invention. FIGS. 12A through C show alternative slit and membrane section configurations in a valve of circular cross-section. FIG. 12A shows a membrane 334 in valve 326 that is bifurcated into two membrane sections 336, 338 by a single diametric slit 340, as described above and shown in FIGS. 11A and 11B. FIG. 12B shows a trifurcated membrane having three sections 348A, B, and C; and FIG. 12C shows a membrane 334 divided into four sections 348 A, B, C, and D. The pressure desired to open the membrane within the valve 326 and the material properties of the membrane 334 will determine the optimal valve membrane configuration for a particular application.

In addition, as shown by FIGS. 12D, E, and F, the diaphragm segments 318 through 324 and valves 326 need not necessarily be of circular cross-sectional configuration. Other sectional configurations may be employed if desired in various membrane slot and sectional configurations.

A shown in FIGS. 13, 14A, 14B, and 15, one or more radial tube(s) 328 may be deployed in a diaphragm system 310 on the inner liner around the rho m (max radial curvature change) point. The tire 12 is mounted to a rim 16 configured having a mounting surface 18 and rim flange 22. Tire sidewalls 32 extend from a bead area 34 to a tread region 38. FIG. 14A shows the radial spoke tube 328 in an uncompressed state opposite to the tire footprint 100 against ground surface 98. The radial tube 328 has an inlet end 352 positioned above the rim flange 22 for admitting outside air 92 through an inlet device 44 into the tube 328. The tube 328 has a radial segment 354 routed around the tire bead area 34 and a series of diaphragm segments 358 extending along the tire inner liner to an outlet tube end 362. End 362 is located adjacent to the tire tread region 38. A pressure regulating valve 356 opens when the air pressure within the tire cavity 40 falls below a preset threshold level. Between the diaphragm tube segments 358 are one or more one-way check valves 360 operational as described above. The diaphragm tube 328 may be arranged in one or more radial "spokes" to travel from apex to shoulder once or several times, flow out to shoulder or back. So arranged, the diaphragm tube(s) 328 will pump independent to the direction of tire 12 rotation 88.

Figure 14B:
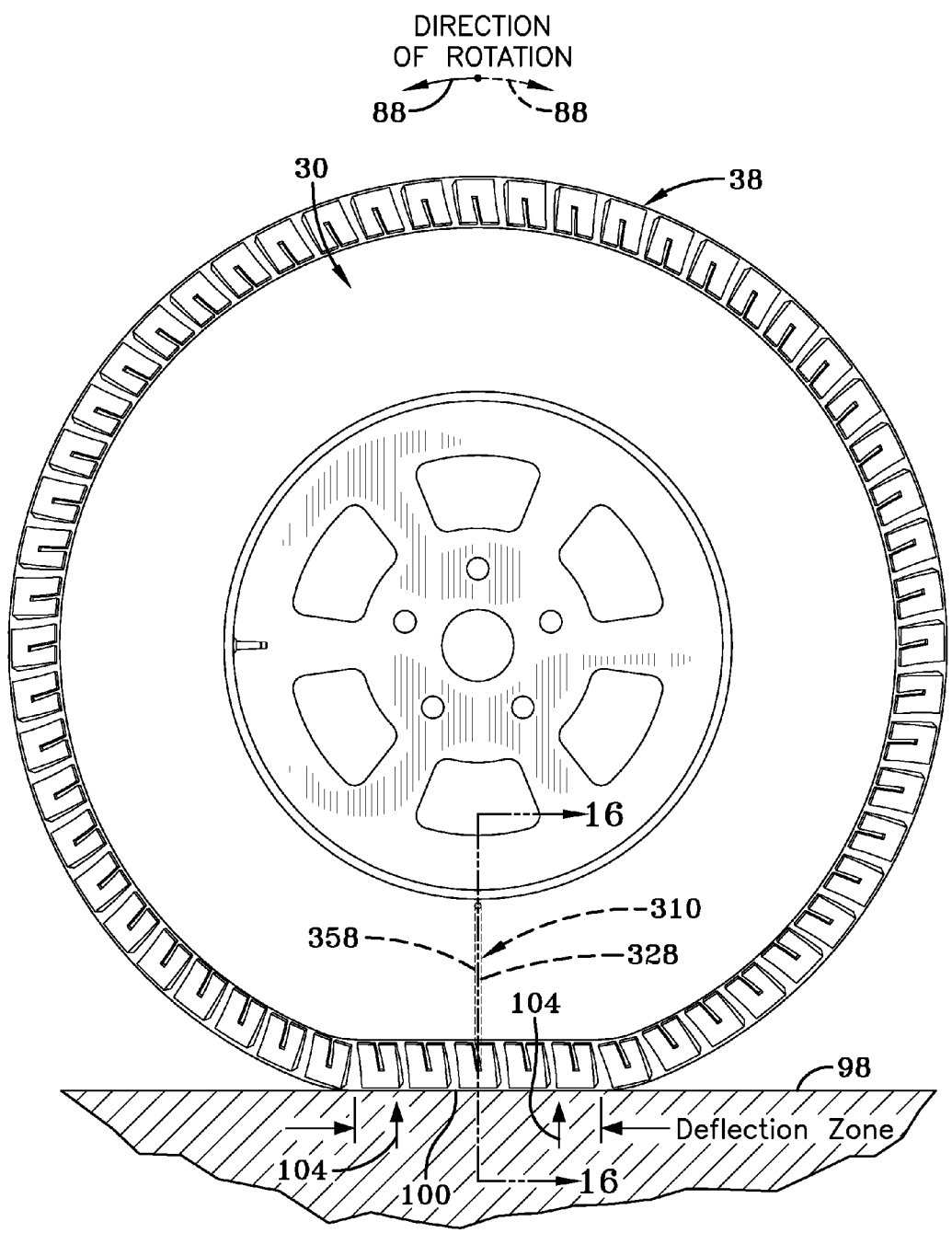
FIG. 14B is a side view of FIG. 13 showing the spoke in the compressed state for section view along the line 16-16.
Figure 16:
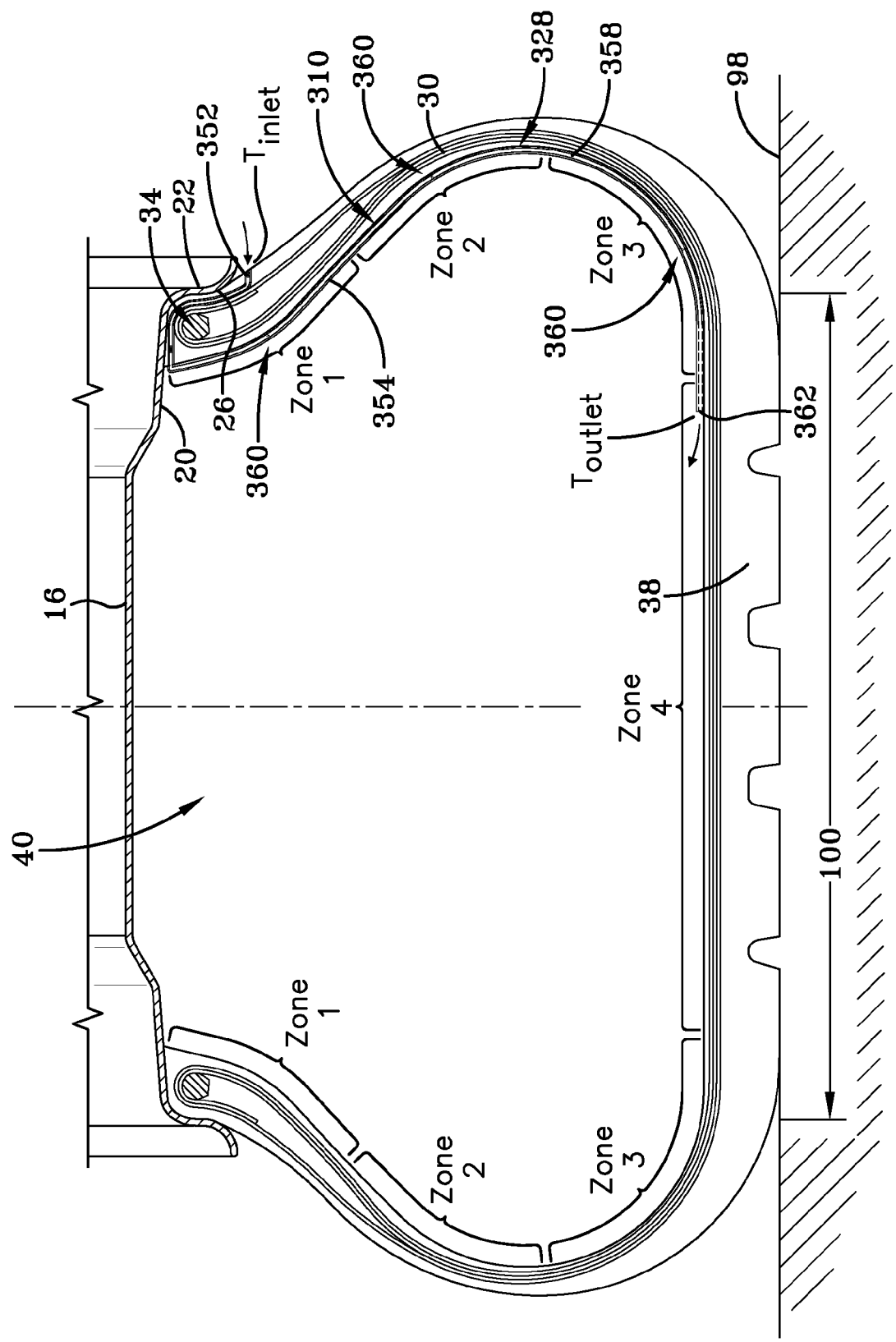
FIG. 16 is a sectioned view in the compressed area taken along the line 16-16 of FIG. 14B.

FIGS. 14B and 16 illustrate the tire rotation to a position wherein the diaphragm tube 328 is within the tire footprint 100. Compressive forces 104 flatten the tire within a deflection zone against ground surface 98 and act to partially sequentially compress the diaphragm segments 354 along the tube 328. Air is forced directionally along the air passageway within tube 328 to the outlet end 362 and into the cavity 40 of the tire. The radial tube "spokes" are preferably sized sufficiently long such that, if adjacent, they will not be deflected or compressed at the same time. The radial tube 328 is positioned on the inner liner at the shoulder at the tire tread region 38.

Figure 15:
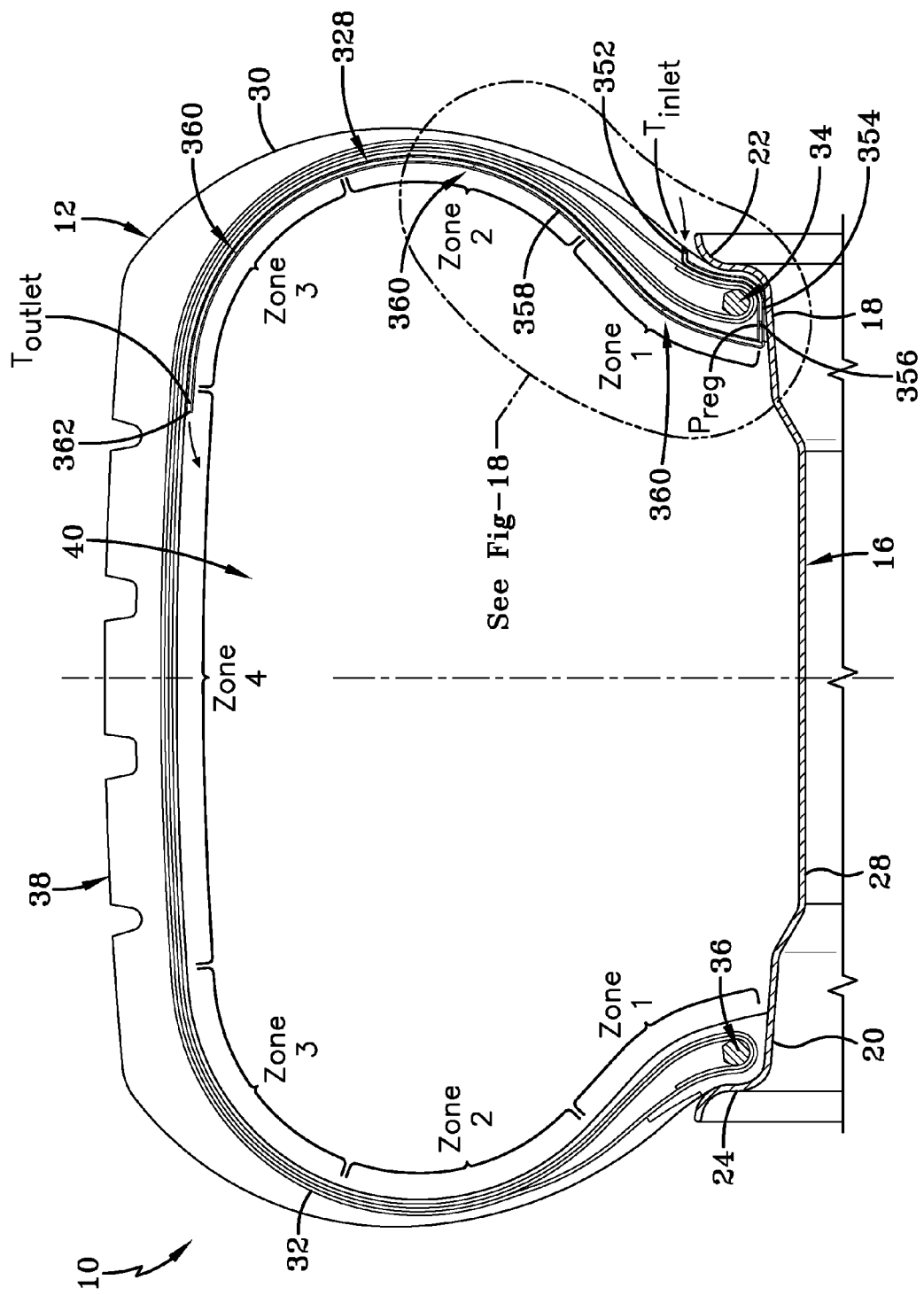
FIG. 15 is a sectioned view in uncompressed area taken along the line 15-15 of FIG. 14 with "Zones" identified to show where the bending occurs in the tire.
Figure 17:
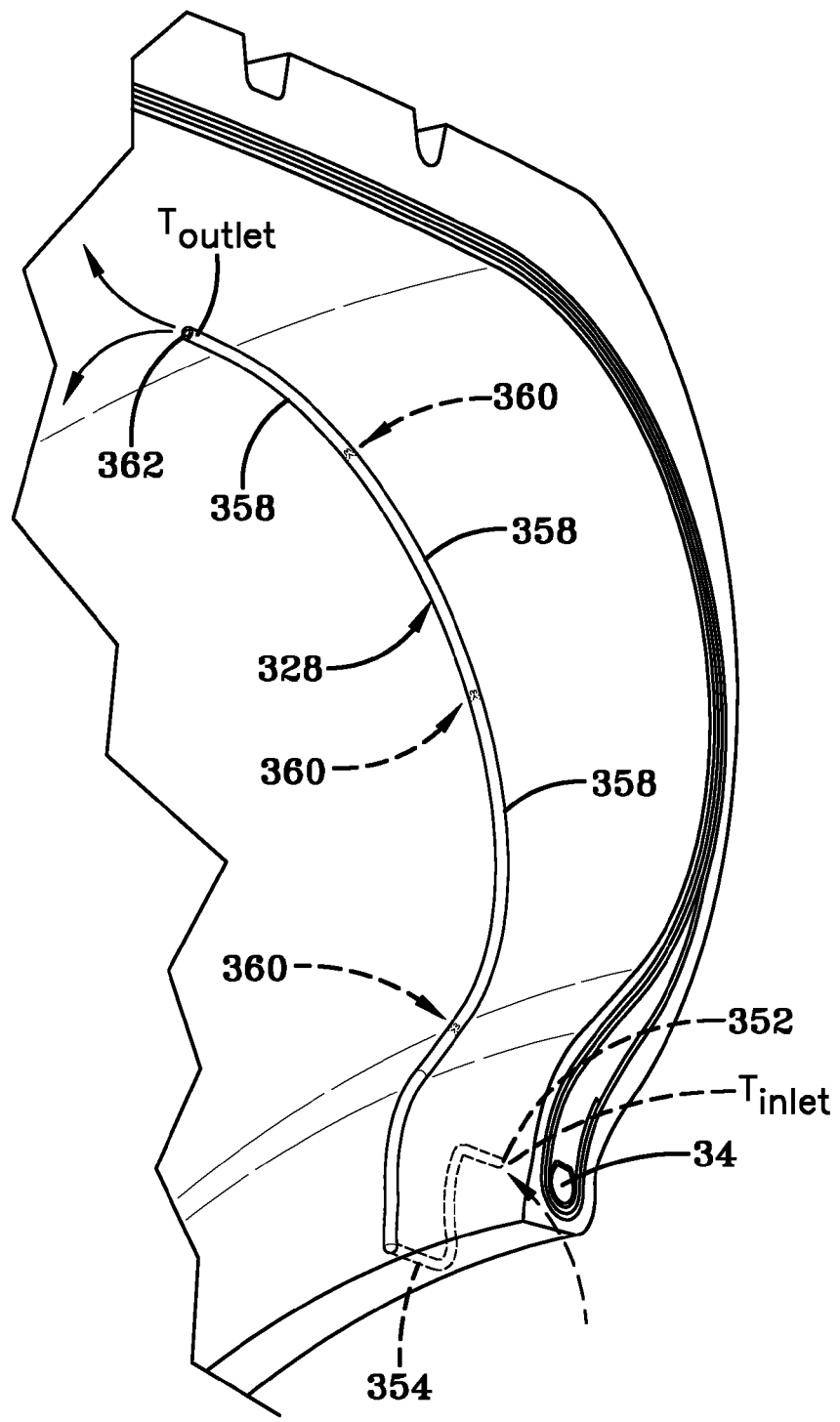
FIG. 17 is an isometric view looking at tube inner sidewall location.
Figure 18:
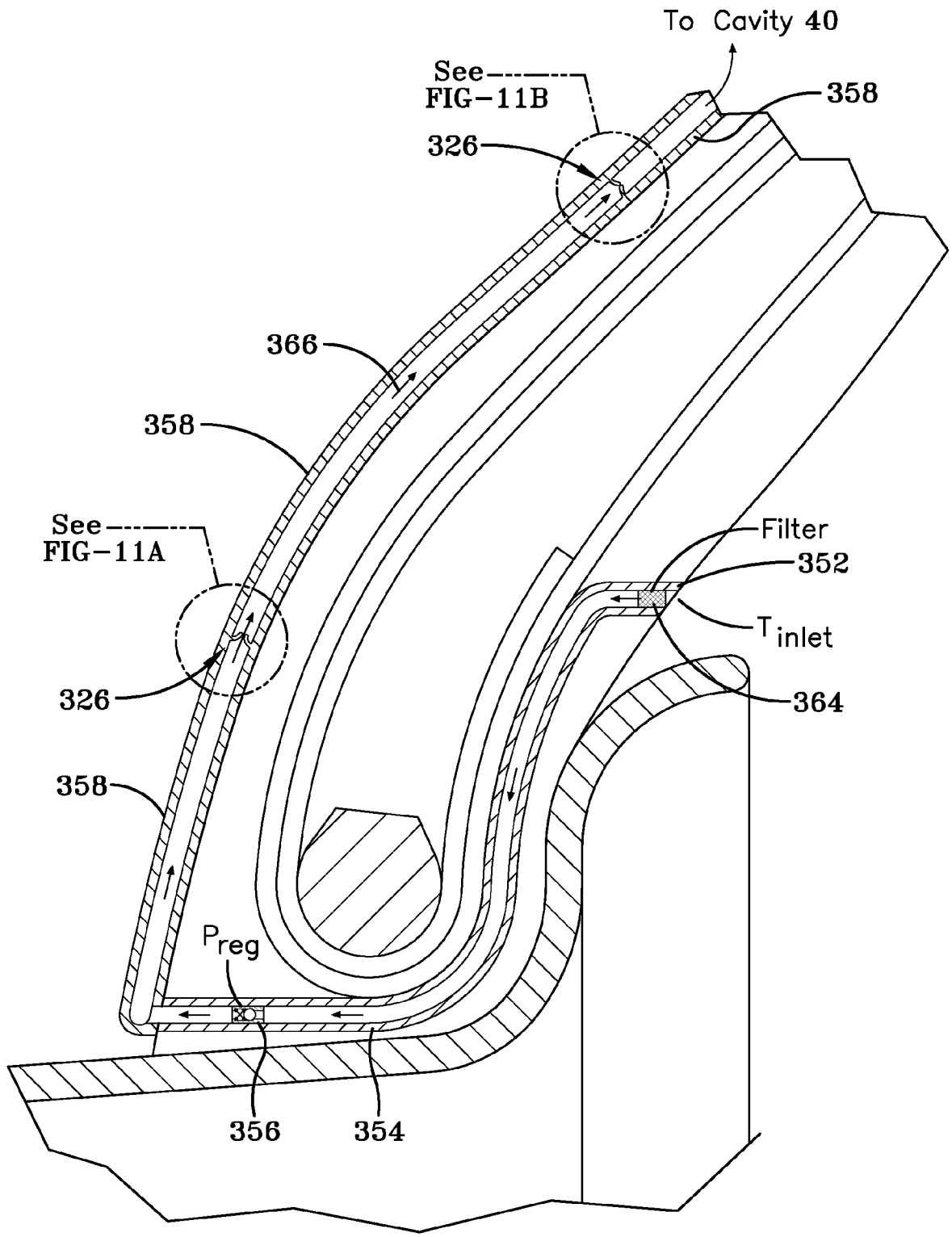
FIG. 18 is an enlarged sectioned view taken of the region identified in FIG. 15.

The bending regions of a tire are shown in FIGS. 15 and 16 as Zones 1, 2, and 3. The bending regions of the tire as identified represent tire areas suitable for the positioning of the tube body 328. So positioned, the tube sections will catch large changes in curvature at footprint leading and trailing edges. The three sections 358 of the radial tube body 328 should be a bit longer than the footprint 100 of the tire. FIGS. 17 and 18 illustrates the positioning of the radial tube body 328 and its components. A filter mechanism 364 may be positioned within the tube 328 at the inlet end 352. The air from outside of the inlet passes through the filter in the direction indicated by arrows 366 and is pumped through the tube 328 diaphragm segment by diaphragm segment 358. Back flow of air opposite to direction 366 is precluded by operation of the check valves 360.

Figure 19:
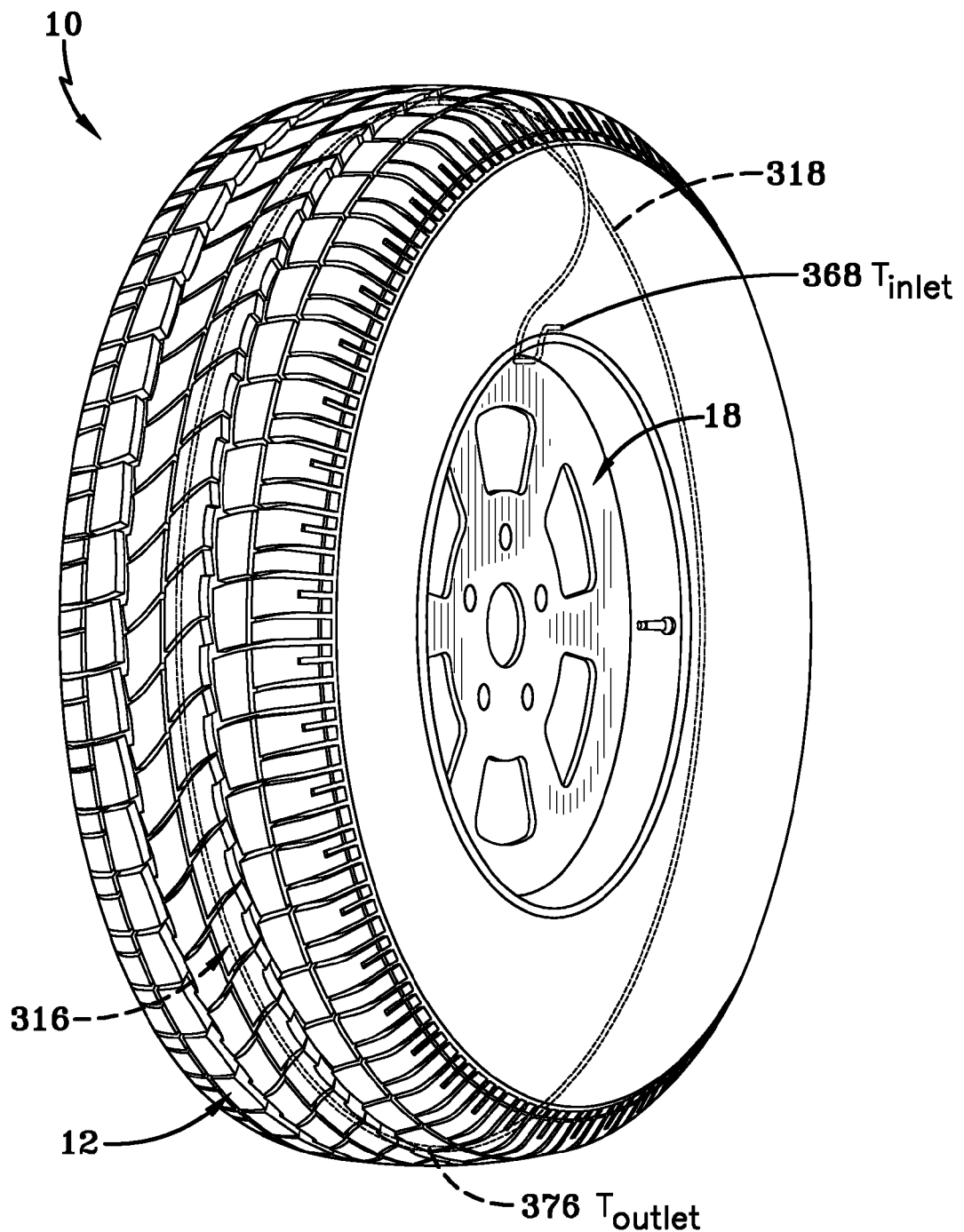
FIG. 19 is an isometric view of a tire showing the location of the circumferential tube embodiment.
Figure 20:
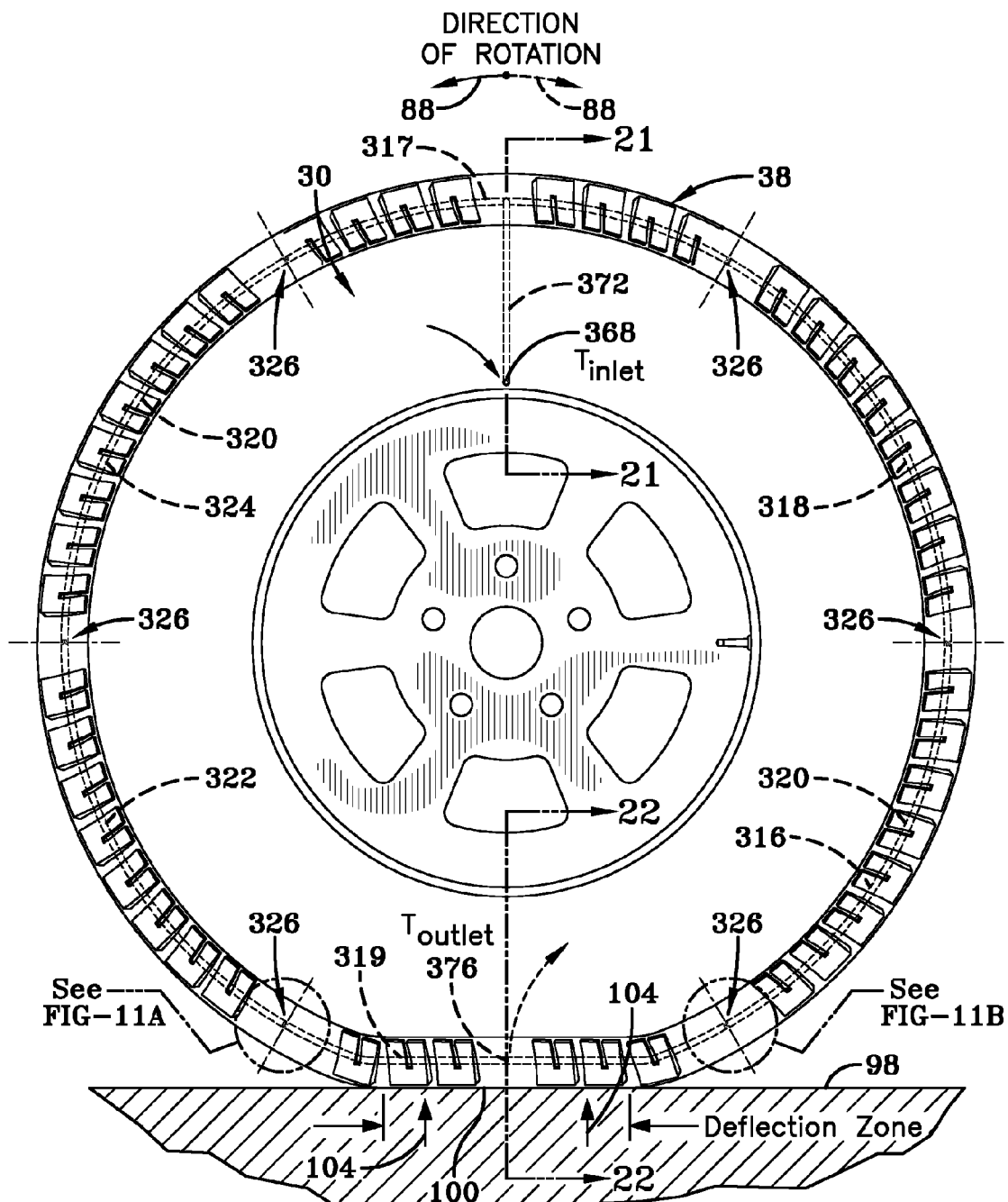
FIG. 20 is a side view of FIG. 19.
Figure 21A:
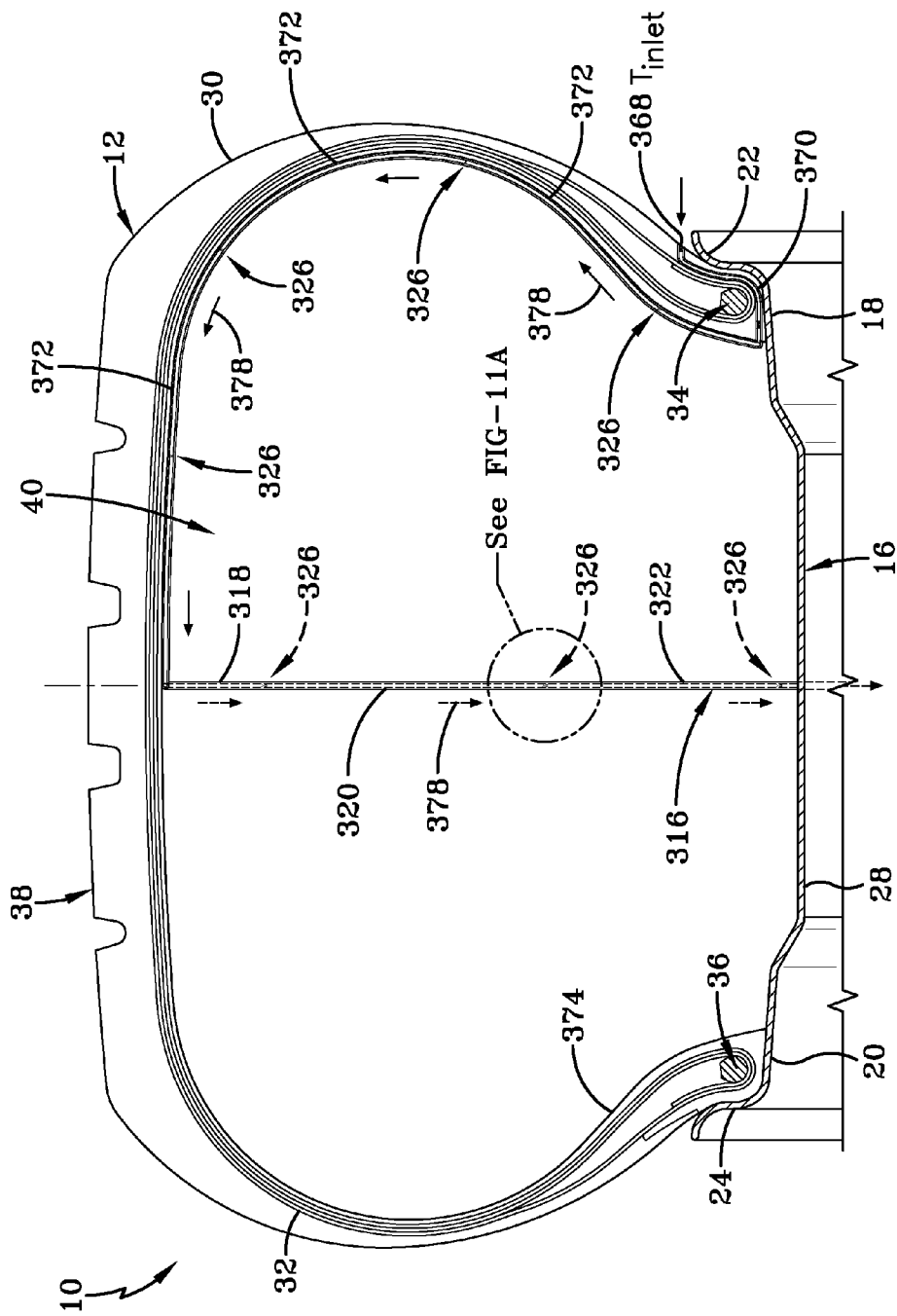
FIG. 21A is a section view taken along line 21-21 of FIG. 20 in the uncompressed state showing circumferential tube location and passageway to outside air.
Figure 21B:
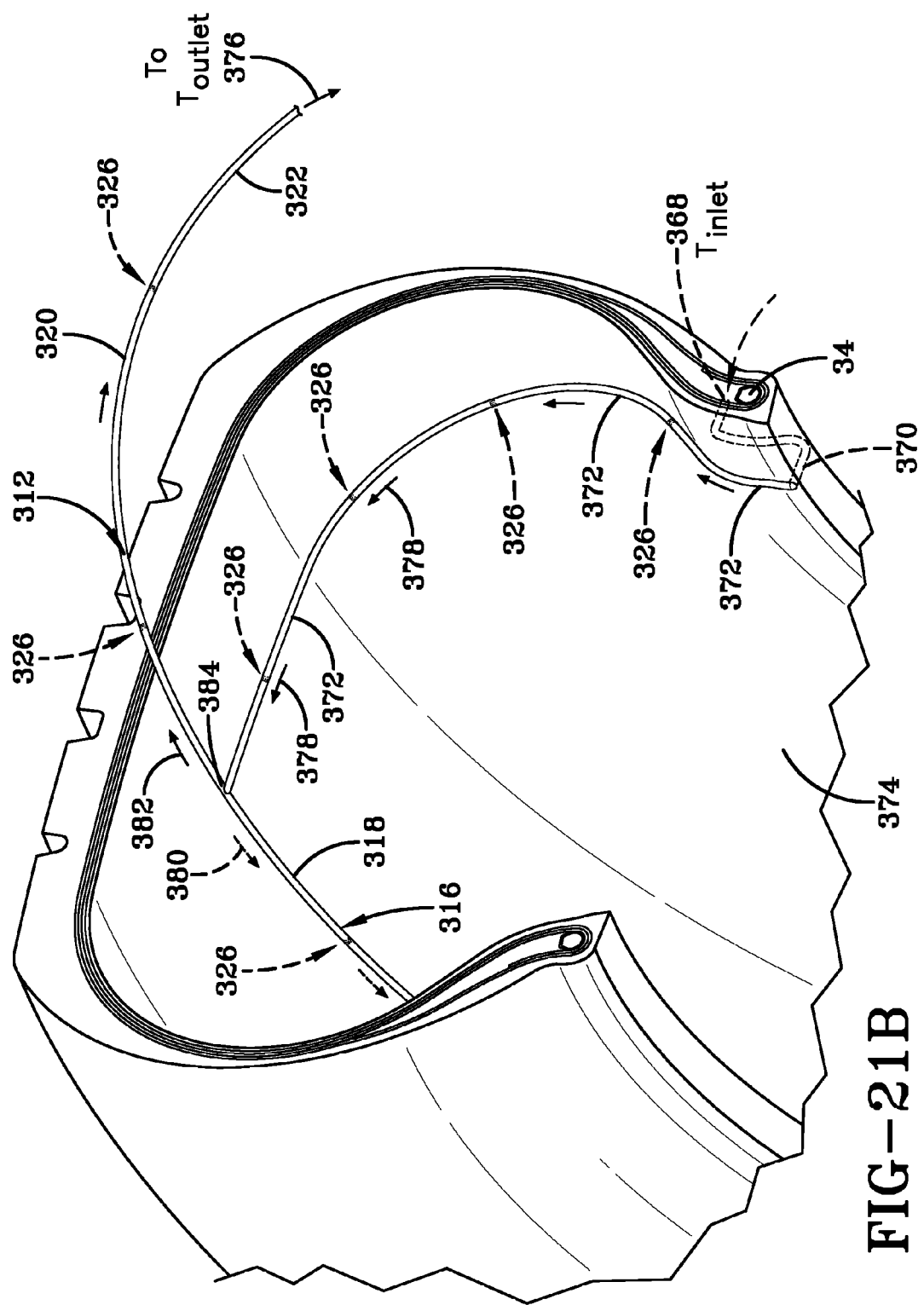
FIG. 21B is an isometric view looking at tube location on inner wall.

FIGS. 19 and 20 show the tire and location of the circumferential tube 316 embodiment. FIGS. 21A and 21B show the tube 316 in the uncompressed state and FIGS. 22A and 22B in the compressed state. With collective reference thereto, the circular tube 316 embodiment routes the diaphragm tube assembly from an inlet end 368 of the tube located on the outside of tire 12 above the rim flange 22. The tube includes a radial tube segment 370 extending radially inward from the inlet end 368 around the bead 34 to a tire inner liner side 374. Tube inlet segments 372 are adjoining along the inner liner 374 with adjacent pairs of segments 372 connected by a one-way valve 326. The segments convey air from the inlet to the circular tube body 316.

The circular tube body (see FIG. 10) 316 is positioned along innerliner 374 on the equatorial centerplane of the tire but may be positioned at alternative locations within the tire if desired. The circular tube body 316 as explained previously in reference to FIG. 10, includes adjoining diaphragm segments 318, 320, 322, and 324 with a one-way valve 326 connection each adjacent pair of diaphragm segments. The direction of air flow from the inlet end 368 to the outlet end 376 is indicated by arrows 378. It will be appreciated that the air flow along the air passageway within the tube body is advanced by the sequential collapse of diaphragm segments 318 through 324 as the tire rolls. The segment 318 through 324 near the footprint of the rolling tire will be partially collapsed by forces acting on the tire from the footprint, causing the diaphragm segment to pump air through a valve 326 and into an adjacent adjoining diaphragm segment. As the pumping diaphragm segment leaves proximity to the footprint, it resiliently resumes an uncollapsed normal state while the next adjacent adjoining diaphragm segment is partially collapsed. Pumping of air along the tube air passageway is thus propagated in a one way direction through the one way valves by the sequential collapse of diaphragm segments.

FIGS. 21A and 21B show the circumferential tube body 316 in an uncompressed state and the tube location and passageway to outside air. FIG. 21B illustrates the flow of air 378 into the tube at 368, along the innerliner within tube segments 372, and into the circular tube body 316 at intersection 384. The air delivered through segments 372 is unidirectional as shown by arrows 378. At intersection 384 the air flow will divide alternately between paths 380 and 382 around the body 316. Air will be pumped along the circular body passageway 312 in directions 380, 382 alternately as the tire rotates a complete revolution. The air flow 380, 382 is delivered to the outlet end 376.

Figure 22A:
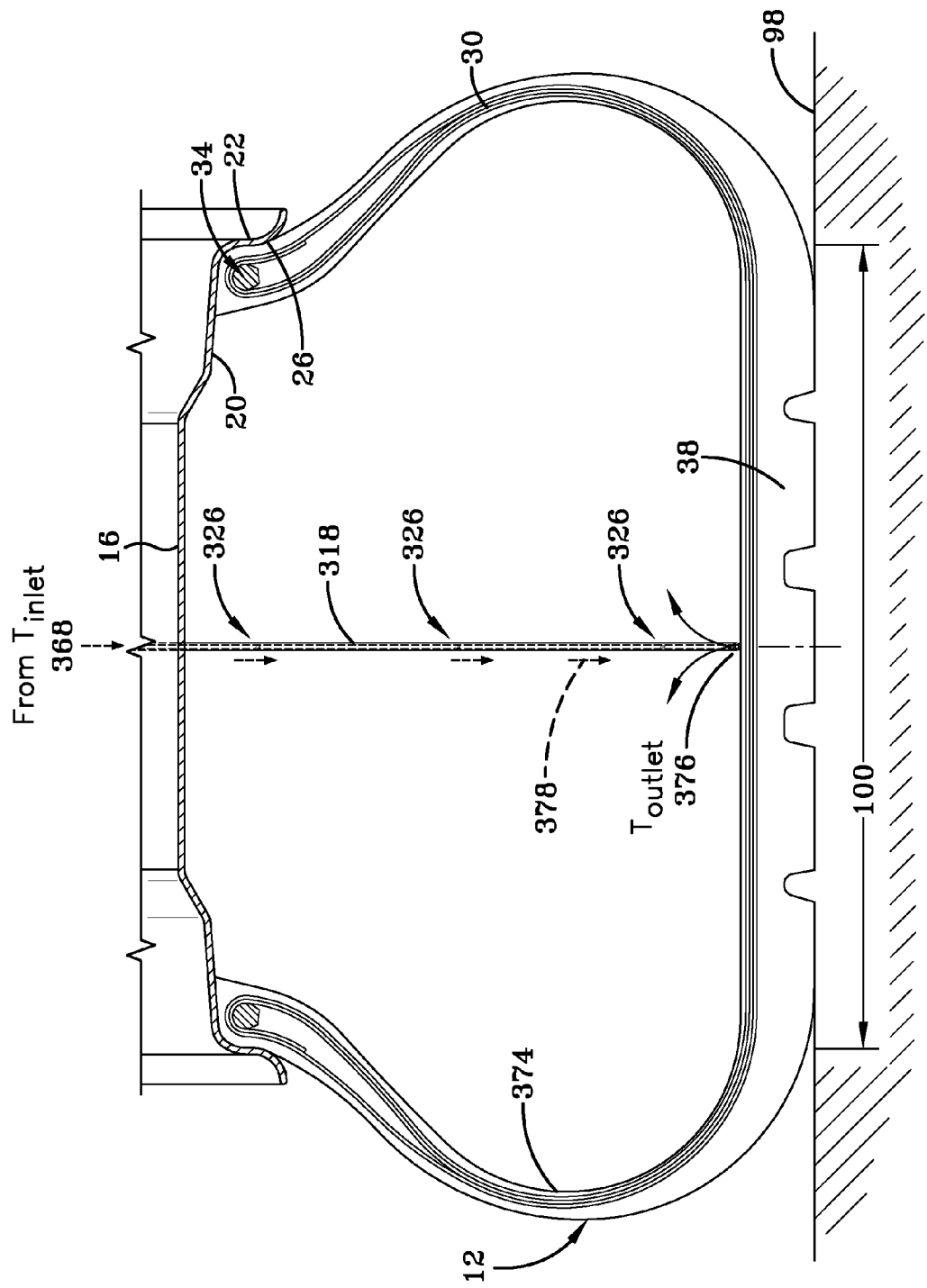
FIG. 22A is a sectioned view taken along line 22-22 from FIG. 20 showing tire in the compressed state.

FIGS. 22A and 22B show the tire 12 in a compressed state against ground surface 98, creating footprint 100. The circular tube body 316 follows the equatorial centerplane of the tire along the inner liner 374, with air pumped from outside the tire through the diaphragm system into the tire cavity. The valves 326 open to allow directional air flow in the desired direction as the circular diaphragm segments 317, 318, 319, 320, 322, and 324 from the inlet radial segment 370 and inlet liner segments 372. Air is progressively, sequentially, and directionally pushed along the passageway 312 extending through the segments and into the tire cavity. The length of the segments of the circular body 316 are preferably although not necessarily approximately equal to or greater than the footprint 100 created by the rolling tire. Such dimensioning causes the diaphragm segments of the tube to flatten one at a time as the tire rotates, whereby ensuring a positive flow of air in the direction desired.

Figure 24:
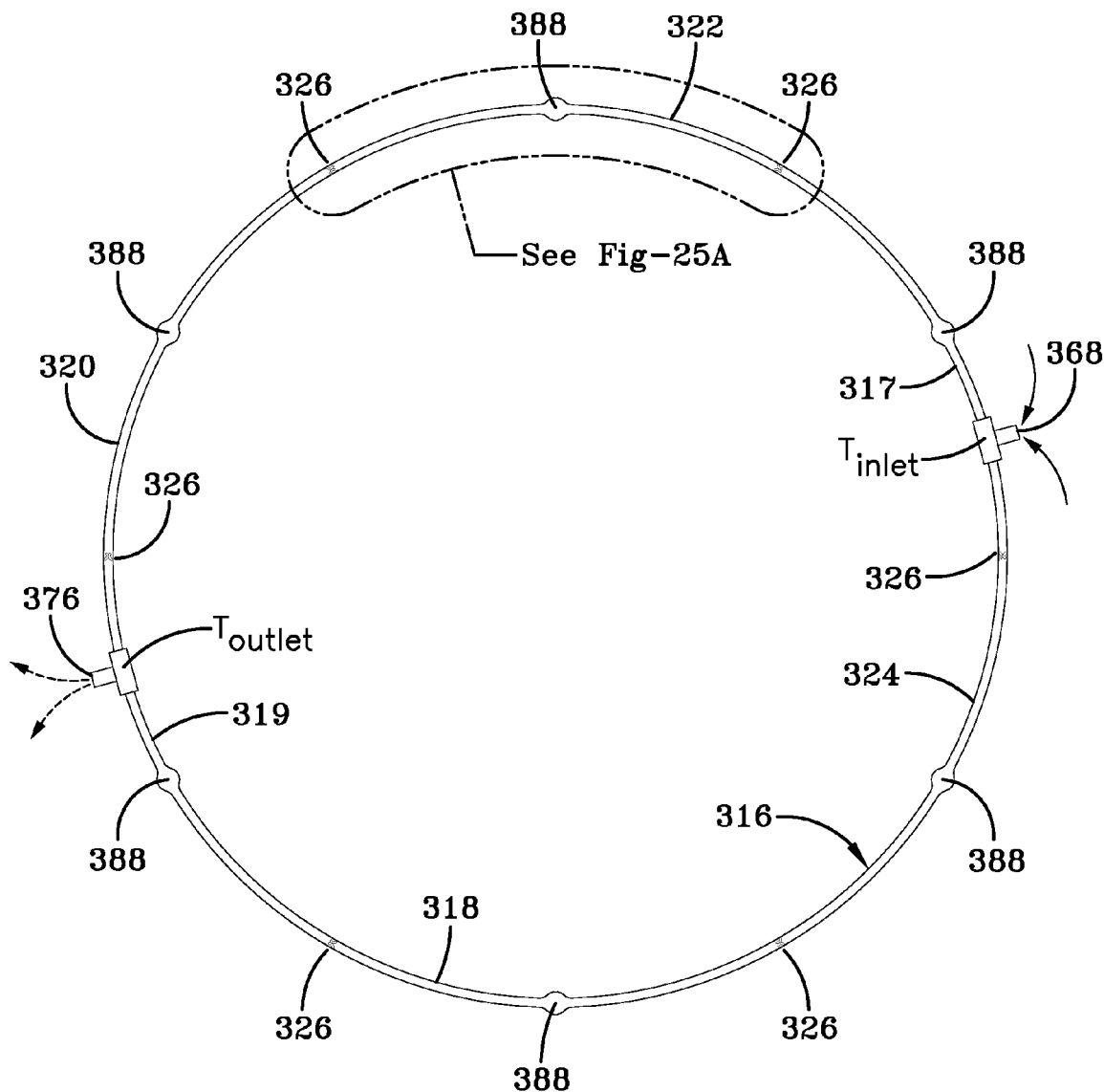
FIG. 24 is a side view of a modified crushed tube segment showing bladder and valve locations.

FIG. 23 is an enlarged view of the outlet opening 386 at the outlet end 376 of the tubular tube outlet segment 319 that vents the pumped air into the tire cavity. FIG. 24 illustrates a modified crushed tube segment having an enlarged bladder portion 388 within each of the segments 317, 318, 319, 320, 322, and 324. The bladder portion 388 will diametrically flatten as each segment containing the bladder portion passes adjacent the rolling tire footprint in the manner described previously.

Figure 25A:
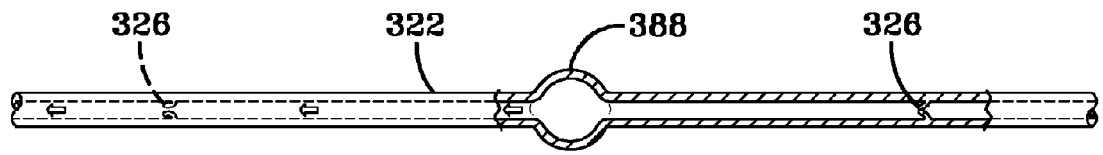
FIG. 25A is an enlarged view of bladder shapes and valve location, taken from FIG. 24.
Figure 25B:
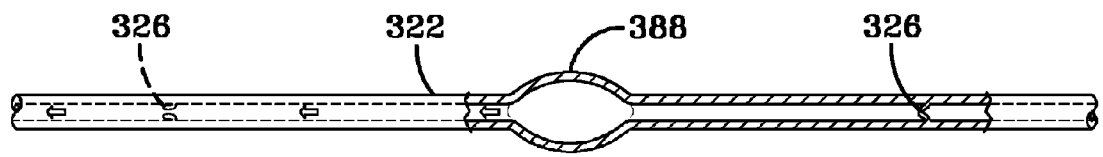
FIGS. 25B through 25D are embodiments of different bladder shapes.
Figure 25C:
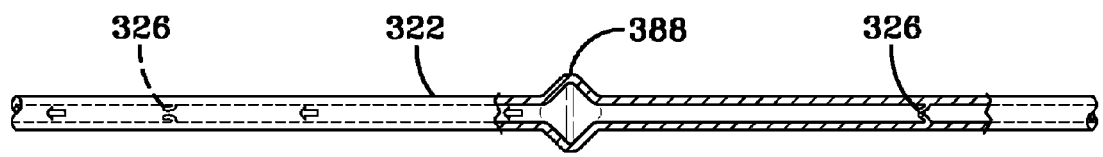
Figure 25D:
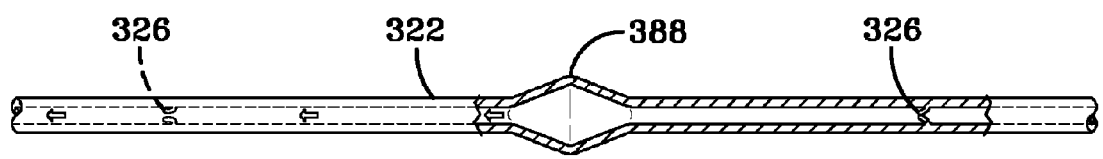

FIG. 25A shows an enlarged view of the bladder shapes and valve locations from FIG. 24. As shown, the bladder portion 388 within the diaphragm tube segment 322 is configured having a generally circular cross sectional profile. FIGS. 25B through 25D show embodiments of different bladder shapes: FIG. 25B a bladder of generally ovular longitudinal section profile; FIG. 25C of shorter quadrilateral longitudinal section profile; and FIG. 25D of elongate quadrilateral longitudinal section profile. Other bladder shapes are within the contemplation of the invention.

As described above, a tube body is attached to a tire that and deformed by tire bending, whether the tube body is of circular configuration 316 or of a radial configuration 354. The tube may be attached to the inside of the tire at a location that undergoes large changes of radius (bending) as that locations rolls through the footprint. Examples of alternative embodiments without intent to limit the invention thereto are:

(A) A radial tube on the inner liner around the rho m (max radial curvature change) point;

(B) A tube arranged in radial "spokes" to travel from apex to shoulder several times, flow out to shoulder or back so as to pump in either direction (the "spokes" arranged and spaced so that adjacent spokes were not deflected at the same time);

(C) a circumferential tube on the inner liner at the point of maximum circumferential curvature change;

(D) a radial tube on the inner liner at the shoulder;

(E) a circumferential tube at the innerliner crown position for the changes in radius as the tire deforms in the footprint.

In such diaphragm system configurations, it is preferred that the spacing between tube sections are sufficient to catch large changes in curvature at footprint leading and trailing edge. Accordingly, the tube sections may be dimensioned nominally longer than the footprint of a rolling tire. Regardless of tube configuration (radial or circular), the tube may be configured as described to provide tube section or segment lengths between check valves such as the segment bladder configurations in the illustrative crush designs of FIGS. 25A through 25D.

Following is a table experimentally verified that shows the section volume reduction of a tube segment in percentage and the segment or section volume compression ratio. Pressure generated by n sections of different volume reductions are identified. Through selection of resilient material composition, geometry, and dimensions of the diaphragm tube and number of tube segments, a desired pressure ratio may be obtained which provides a requisite psig to keep the tire inflated to a desired pressure. Altering the tube segment configuration to include bladder portions as represented in FIGS. 25A through 25D may also be employed to achieve the desired psig for the system.

TABLE 1

Isothermal Case

| Section Volume Reduction | Section Compression Ratio | Number of Sections | Pressure Ratio | PSIG |
|---|---|---|---|---|
| 33.3% | 1.5 | 4 | 5.1 | 59.7 |
| 16.7% | 1.2 | 8 | 4.3 | 48.5 |
| 9.1% | 1.1 | 16 | 4.6 | 52.8 |

TABLE 2

Adiabatic Case

| Section Volume Reduction | Section Volume Compression Ratio | Section Pressure Ratio | Number of Sections | Pressure Ratio | PSIG |
|---|---|---|---|---|---|
| 33.3% | 1.5 | 1.8 | 4 | 9.7 | 127.7 |
| 16.7% | 1.2 | 1.3 | 8 | 7.7 | 98.6 |
| 9.1% | 1.1 | 1.1 | 16 | 8.5 | 109.6 |

From the foregoing, it will be appreciated that the subject invention provides a self-inflating tire assembly 10 that includes one or more air tube(s). In a circular diaphragm tube body 316, the tube includes a plurality of adjoining diaphragm segments 317, 318, 319, 320, 322, and 324.containing compressible diaphragm chambers separated by a one-way check valve 326. The tube body may alternatively be configured in a radial configuration 354 if desired. An air passageway 312 extends through the air tube and the diaphragm chambers. The one-way valve allows a directional passage of air through the valve from an inlet valve side an outlet valve side. The air tube being is composed of a flexible material operative to allow an air tube segment near a tire footprint to at least partially flatten, the tire footprint in a rotating tire being operative to sequentially compress the diaphragm chambers to pump air through the one-way valve between the diaphragm chambers and along the air passageway from an inlet device to an outlet device. The adjacent diaphragm segments have respective volumes and dimensions sized to compress one segment at a time in a rolling tire. The adjacent diaphragm segments have a respective segment length equating or slightly larger than the tire footprint deformation of a rolling tire. The flattened tube segments resiliently return to an un-flattened condition when repositioned by continued tire rotation outside the tire tread footprint. The one-way valves 326 or 360 are configured as a membrane body, the membrane body having one or more through-slit(s) closed to air flow through the membrane body toward the inlet device and open to air flow through the membrane body toward the outlet device. So configured and positioned, the membrane body substantially blocks the air passageway between the diaphragm chambers in a closed condition and at least partially deforms in an open condition to allow a flow of air through the through-slits only in the direction of the outlet device.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
a tire having a tire cavity, first and second sidewalls extending respectively from first and second tire bead regions to a tire tread region;
at least one air tube connected to the tire and having a plurality of adjacent diaphragm segments containing respective adjoining diaphragm chambers and an air passageway extending through the air tube and the diaphragm chambers, at least one adjacent pair of the adjoining diaphragm chambers separated by a one-way check valve allowing a directional passage of air through the valve from an inlet valve side to an outlet valve side, the air tube being composed of an elastic material operative to sequentially at least partially collapse adjacent diaphragm segments passing near a rolling tire footprint to pump air through the one-way valve between the adjoining diaphragm chambers along the air passageway;
an inlet device positioned within the air passageway operative to pass air into the air passageway;
an outlet device positioned within the passageway operative in an open position to pass air within the air passageway into the tire cavity;
wherein the adjacent diaphragm segments have respective volumes sized to compress one segment at a time in a rolling tire; and
wherein the adjacent diaphragm segments have a respective segment length substantially equivalent to a segment length of the air tube flattened by a tire footprint deformation.

2. The tire assembly of claim 1, wherein the tube segment resiliently returns to an un-flattened condition when repositioned by tire rotation outside the tire tread footprint.

3. The tire assembly of claim 2, wherein the air tube comprises a radial segment extending from the inlet device to a radially inward tire location.

4. A self-inflating tire assembly comprising:
a tire having a tire cavity, first and second sidewalls extending respectively from first and second tire bead regions to a tire tread region;
at least one air tube connected to the tire and having a plurality of adjacent diaphragm segments containing respective adjoining diaphragm chambers and an air passageway extending through the air tube and the diaphragm chambers, at least one adjacent pair of the adjoining diaphragm chambers separated by a one-way check valve allowing a directional passage of air through the valve from an inlet valve side to an outlet valve side, the air tube being composed of an elastic material operative to sequentially at least partially collapse the adjacent diaphragm segments passing near a rolling tire footprint to pump air through the one-way valve between the adjoining diaphragm chambers along the air passageway;
an inlet device positioned within the air passageway operative to pass air into the air passageway;
an outlet device positioned within the passageway operative in an open position to pass air within the air passageway into the tire cavity;
wherein the one-way check valve comprises a membrane body substantially blocking the air passageway between the adjoining diaphragm chambers in a closed condition and at least partially deforming in an open condition to allow a flow of air through the membrane body toward the outlet device.

5. The tire assembly of claim 4, wherein the membrane body is composed of an elastomeric material composition.

6. The tire assembly of claim 5, wherein the membrane body comprises at least one through-slit closed to air flow through the membrane body toward the inlet device and open to air flow through the membrane body toward the outlet device.

7. The tire assembly of claim 6, wherein the outlet device comprises an outlet portal in air flow communication with the tire cavity.

8. The tire assembly of claim 4, wherein the air tube comprises a substantially circular array of air tube segments that sequentially flatten segment by segment near a tire footprint as the tire assembly rotates against a ground surface.

9. The tire assembly of claim 8, wherein the diaphragm chambers of the adjacent diaphragm segments sequentially partially compress as a respective adjacent diaphragm segment passes near the rolling tire footprint and elastically expand as the respective adjacent diaphragm segment moves away from the rolling tire footprint.

10. The tire assembly of claim 9, wherein the outlet device and the inlet device are mounted to the annular air tube substantially 180 degrees apart.

11. The tire assembly of claim 10, wherein the air tube is sequentially flattened by the rolling tire footprint to pump air along the air passageway between the diaphragm chambers of the adjacent pair of air tube segments in a flow direction from the inlet device to the outlet device.

12. The tire assembly of claim 11, wherein a partially flattened tube segment resiliently returns to an un-flattened condition when repositioned by tire rotation away from the rolling tire footprint.

13. The tire assembly of claim 12, wherein the one-way valve comprises a membrane body substantially blocking the air passageway between the diaphragm chambers in a closed condition and at least partially deforming in an open condition to allow a flow of air through the membrane body toward the outlet device.

14. The tire assembly of claim 13, wherein the membrane body is composed of an elastomeric material composition.

15. The tire assembly of claim 14, wherein the membrane body comprises at least one through-slit closed to air flow through the membrane body toward the inlet device and open to air flow through the membrane body toward the outlet device.

16. A self-inflating tire assembly comprising:
a tire having a tire cavity, first and second sidewalls extending respectively from first and second tire bead regions to a tire tread region;
at least one tubular air passageway within a one sidewall of the tire and having a plurality of adjoining collapsible diaphragm segments containing respective adjoining diaphragm chambers, at least one adjacent pair of the adjoining diaphragm chambers separated by a one-way check valve located within the tubular air passageway and within the one sidewall of the tire, the check valve operative to allow a directional passage of air through the valve from one of the adjoining diaphragm chambers to a second of the adjoining diaphragm chambers responsive to a sequential collapsing of the adjoining diaphragm segments;
the tubular air passageway being defined by tubular sidewalls composed of an elastic material operative to sequentially at least partially collapse the adjoining diaphragm segments passing near a rolling tire footprint to pump air through the one-way valve between the adjacent diaphragm chambers along the air passageway;

an inlet device positioned within the air passageway operative to pass air into the air passageway;

an outlet device positioned within the passageway operative in an open position to pass air within the air passageway into the tire cavity.

17. The tire assembly of claim 16, wherein the check valve comprising a membrane body substantially blocking the air passageway between the diaphragm chambers in a closed condition and at least partially deforming in an open condition to allow a flow of air through the membrane body.

18. The tire assembly of claim 16, wherein the adjacent diaphragm segments have a respective segment length substantially equivalent to a length of the tubular air passageway flattened by a tire footprint deformation.

\* \* \* \* \*